US012710516B2

(12) United States Patent
Behroozpour et al.

(10) Patent No.: US 12,710,516 B2
(45) Date of Patent: Aug. 18, 2026

(54) SIGNAL CHIRP IN LIDAR OUTPUT SIGNALS

(71) Applicant: SiLC Technologies, Inc., Monrovia, CA (US)

(72) Inventors: Behnam Behroozpour, South San Francisco, CA (US); Nirmal Chindhu Warke, Saratoga, CA (US); Patrick Nercessian, Burbank, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 645 days.

(21) Appl. No.: 18/218,556

(22) Filed: Jul. 5, 2023

(65) Prior Publication Data

US 2025/0012906 A1 Jan. 9, 2025

(51) Int. Cl.

*G01C 3/08* (2006.01)
*G01S 7/4913* (2020.01)
*G01S 17/58* (2006.01)

(52) U.S. Cl.

CPC ............ *G01S 7/4913* (2013.01); *G01S 17/58* (2013.01)

(58) Field of Classification Search

CPC ............................... G01S 7/4913; G01S 17/58
See application file for complete search history.

(56) References Cited

U.S. PATENT DOCUMENTS

| | | |
|---|---|---|
| 4,168,906 A | 9/1979 | Schwiesow |
| 4,262,993 A | 4/1981 | Burns et al. |

(Continued)

FOREIGN PATENT DOCUMENTS

| | | |
|---|---|---|
| CA | 3191688 A | 3/2022 |
| CN | 1668939 A | 9/2005 |

(Continued)

OTHER PUBLICATIONS

Rodriquez, Kari, International Search Report and Written Opinion, Application No. PCT/US2024/035659, International Searching Authority, United States Patent and Trademark Office, Sep. 19, 2024.

(Continued)

*Primary Examiner* — Mark Hellner
(74) *Attorney, Agent, or Firm* — Gavrilovich, Dodd & Lindsey LLP

(57) ABSTRACT

A LIDAR system transmits a system output signal from the LIDAR system such that a sample region is illuminated by the system output signal. The LIDAR system includes a first light signal combiner configured to combine light that returns to the LIDAR system from the system output signal with light from a reference signal so as to generate a composite signal beating at a composite beat frequency. The LIDAR system includes a local light signal combiner configured to combine a first local signal with a second local signal so as to generate a local beating signal beating at a local beat frequency. The reference signal, the system output signal, the first local signal, and the second local signal each includes light from an outgoing LIDAR signal. The LIDAR system also includes electronics that perform a calculation of LIDAR data for the sample region. The LIDAR data for the sample region includes the distance between the LIDAR system and an object in the sample region and/or a radial velocity between the LIDAR system and the object in the sample region. A variable in the calculation is a normalized beat frequency. The normalized beat frequency is the composite beat frequency normalized by a normalizing local beat frequency that is a function of the local beat frequency.

22 Claims, 12 Drawing Sheets

(56) References Cited

U.S. PATENT DOCUMENTS

| | | | |
|---|---|---|---|
| 4,472,020 | A | 9/1984 | Evanchuk |
| 4,523,803 | A | 6/1985 | Arao et al. |
| 4,721,385 | A | 1/1988 | Jelalian et al. |
| 4,786,132 | A | 11/1988 | Gordon |
| 4,845,703 | A | 7/1989 | Suzuki |
| 4,914,665 | A | 4/1990 | Sorin |
| 4,955,028 | A | 9/1990 | Alfeness et al. |
| 4,987,832 | A | 1/1991 | Klink et al. |
| 4,995,720 | A | 2/1991 | Amzajerdian |
| 5,041,832 | A | 8/1991 | Gulczynski |
| 5,194,906 | A | 3/1993 | Kimura et al. |
| 5,289,252 | A | 2/1994 | Nourrcier |
| 5,305,412 | A | 4/1994 | Paoli |
| 5,323,223 | A | 6/1994 | Hayes |
| 5,396,328 | A | 3/1995 | Jestel et al. |
| 5,500,910 | A | 3/1996 | Boudreau et al. |
| 5,847,816 | A | 12/1998 | Zediker et al. |
| 5,889,490 | A | 3/1999 | Wachter et al. |
| 5,953,468 | A | 9/1999 | Finnila et al. |
| 5,977,538 | A | 11/1999 | Unger et al. |
| 5,995,810 | A | 11/1999 | Karasawa |
| 6,035,083 | A | 3/2000 | Brennan, III et al. |
| 6,040,898 | A | 3/2000 | Mrosik et al. |
| 6,108,472 | A | 8/2000 | Rickman et al. |
| 6,285,288 | B1 | 9/2001 | Langdon et al. |
| 6,400,500 | B1 | 6/2002 | Tidmarsh et al. |
| 6,480,513 | B1 | 11/2002 | Kapany et al. |
| 6,556,759 | B2 | 4/2003 | Roberts et al. |
| 6,567,573 | B1 | 5/2003 | Domash et al. |
| 6,687,010 | B1 | 2/2004 | Horri et al. |
| 6,921,490 | B1 | 7/2005 | Qian et al. |
| 6,959,133 | B2 | 10/2005 | Vancoill et al. |
| 6,970,621 | B1 | 11/2005 | Fried |
| 6,977,502 | B1 | 12/2005 | Hertz |
| 7,345,744 | B2 | 3/2008 | Halmos et al. |
| 7,375,877 | B1 | 5/2008 | Di Teodoro et al. |
| 7,535,390 | B2 | 5/2009 | Hsu |
| 7,907,333 | B2 | 3/2011 | Coyle |
| 8,165,433 | B2 | 4/2012 | Jenkins et al. |
| 8,213,751 | B1 | 7/2012 | Ho et al. |
| 8,311,374 | B2 | 11/2012 | Hochberg et al. |
| 8,326,100 | B2 | 12/2012 | Chen et al. |
| 8,410,566 | B2 | 4/2013 | Qian et al. |
| 8,541,744 | B1 | 9/2013 | Liu |
| 8,558,993 | B2 | 10/2013 | Newbury et al. |
| 8,885,678 | B1 | 11/2014 | Kupershmidt |
| 9,157,790 | B2 | 10/2015 | Shpunt et al. |
| 9,176,282 | B2 | 11/2015 | Pottier et al. |
| 9,217,831 | B1 | 12/2015 | Asghari |
| 9,235,097 | B2 | 1/2016 | Meade et al. |
| 9,270,078 | B2 | 2/2016 | Rickman et al. |
| 9,310,471 | B2 | 4/2016 | Sayyah et al. |
| 9,310,487 | B2 | 4/2016 | Sakimura et al. |
| 9,519,052 | B2 | 12/2016 | Gusev |
| 9,551,832 | B1 | 1/2017 | Bovington et al. |
| 9,575,341 | B2 | 2/2017 | Heck et al. |
| 9,606,234 | B2 | 3/2017 | Major, Jr. et al. |
| 9,625,580 | B2 | 4/2017 | Kotelnikov et al. |
| 9,735,885 | B1 | 8/2017 | Sayyah et al. |
| 9,740,079 | B1 | 8/2017 | Davids et al. |
| 9,748,726 | B1 | 8/2017 | Morton et al. |
| 9,753,351 | B2 | 9/2017 | Eldada |
| 9,778,363 | B2 | 10/2017 | Kadambi et al. |
| 9,798,166 | B1 | 10/2017 | Sharma et al. |
| 9,823,118 | B2 | 11/2017 | Doylend et al. |
| 9,841,495 | B2 | 12/2017 | Campbell et al. |
| 9,851,443 | B2 | 12/2017 | Chen |
| 9,857,468 | B1 | 1/2018 | Eichenholz et al. |
| 9,893,737 | B1 | 2/2018 | Keramat et al. |
| 10,003,168 | B1 | 6/2018 | Villeneuve |
| 10,007,060 | B1 | 6/2018 | Qian et al. |
| 10,094,916 | B1 | 10/2018 | Droz et al. |
| 10,137,903 | B2 | 11/2018 | Tascione et al. |
| 10,222,474 | B1 | 3/2019 | Raring et al. |
| 10,274,599 | B2 | 4/2019 | Schmalenberg |
| 10,281,322 | B2 | 5/2019 | Doylend et al. |
| 10,345,447 | B1 | 7/2019 | Hicks |
| 10,345,497 | B2 | 7/2019 | Wu et al. |
| 10,397,019 | B2 | 8/2019 | Hartung et al. |
| 10,564,268 | B2 | 2/2020 | Turbide et al. |
| 10,605,901 | B2 | 3/2020 | Lee et al. |
| 10,627,496 | B2 | 4/2020 | Schmalenberg et al. |
| 10,649,306 | B2 | 5/2020 | Skirlo et al. |
| 10,739,256 | B1 | 8/2020 | Rickman et al. |
| 10,761,195 | B2 | 9/2020 | Donovan |
| 10,782,782 | B1 | 9/2020 | DeSalvo et al. |
| 10,788,582 | B2 | 9/2020 | Feng et al. |
| 10,816,649 | B1 | 10/2020 | Keyser et al. |
| 10,845,480 | B1 | 11/2020 | Shah et al. |
| 10,901,074 | B1 | 1/2021 | Pan et al. |
| 10,962,713 | B2 | 3/2021 | Lee |
| 11,022,683 | B1 | 6/2021 | Rezk |
| 11,067,668 | B1 | 7/2021 | Bravo |
| 11,114,815 | B1 | 9/2021 | Chen et al. |
| 11,119,219 | B1 | 9/2021 | LaChapelle et al. |
| 11,162,789 | B2 | 11/2021 | Lodin et al. |
| 11,170,476 | B1 | 11/2021 | Toshiwal et al. |
| 11,175,388 | B1 | 11/2021 | Wood et al. |
| 11,221,404 | B1 | 1/2022 | DeSalvo et al. |
| 11,300,683 | B2 | 4/2022 | Bao et al. |
| 11,378,691 | B2 | 7/2022 | Boloorian et al. |
| 11,448,729 | B2 | 9/2022 | Baba et al. |
| 11,454,724 | B2 | 9/2022 | Michaels et al. |
| 11,486,975 | B1 | 11/2022 | Xiao |
| 11,493,753 | B1 | 11/2022 | Wood et al. |
| 11,525,916 | B2 | 12/2022 | Avci et al. |
| 11,536,805 | B2 | 12/2022 | Asghari et al. |
| 11,579,300 | B1 | 2/2023 | Li |
| 11,635,491 | B2 | 4/2023 | Asghari et al. |
| 11,710,938 | B2 | 7/2023 | Kwon et al. |
| 11,714,167 | B2 | 8/2023 | Feng et al. |
| 11,768,419 | B1 | 9/2023 | Schroder et al. |
| 11,815,720 | B1 | 11/2023 | Tavallaee et al. |
| 11,860,304 | B2 | 1/2024 | Ren et al. |
| 11,908,075 | B2 | 2/2024 | Gorantla |
| 2002/0031304 | A1 | 3/2002 | Roberts et al. |
| 2002/0105632 | A1 | 8/2002 | Holton |
| 2002/0122398 | A1 | 9/2002 | Jou |
| 2002/0159700 | A1 | 10/2002 | Coroy et al. |
| 2003/0030582 | A1 | 2/2003 | Vickers |
| 2003/0031407 | A1 | 2/2003 | Weisberg et al. |
| 2003/0142943 | A1 | 7/2003 | Yegnanarayanan et al. |
| 2003/0183603 | A1 | 10/2003 | Forsman et al. |
| 2003/0212520 | A1 | 11/2003 | Campos et al. |
| 2003/0231686 | A1 | 12/2003 | Liu |
| 2004/0062469 | A1 | 4/2004 | Ionov |
| 2004/0081388 | A1 | 4/2004 | Koyama |
| 2004/0085612 | A1 | 5/2004 | Livingston et al. |
| 2004/0136412 | A1 | 7/2004 | Jones |
| 2004/0228564 | A1 | 11/2004 | Gunn, III et al. |
| 2004/0233964 | A1 | 11/2004 | Yamanaka et al. |
| 2004/0249561 | A1 | 12/2004 | Capozzi et al. |
| 2005/0123227 | A1 | 6/2005 | Vonsovici et al. |
| 2005/0135730 | A1 | 6/2005 | Welch et al. |
| 2005/0213103 | A1 | 9/2005 | Everett et al. |
| 2005/0219068 | A1 | 10/2005 | Jones et al. |
| 2005/0237617 | A1 | 10/2005 | Carr et al. |
| 2005/0244103 | A1 | 11/2005 | Kwakernaak |
| 2006/0078257 | A1 | 4/2006 | Park et al. |
| 2006/0114447 | A1 | 6/2006 | Harris et al. |
| 2006/0232763 | A1 | 10/2006 | Jokinen |
| 2007/0024849 | A1 | 2/2007 | Carrig et al. |
| 2007/0024956 | A1 | 2/2007 | Coyle |
| 2007/0036486 | A1 | 2/2007 | Miyadera et al. |
| 2007/0103362 | A1 | 5/2007 | Arikan et al. |
| 2007/0171407 | A1 | 7/2007 | Cole et al. |
| 2007/0189341 | A1 | 8/2007 | Belsley |
| 2007/0223856 | A1 | 9/2007 | Nunoya et al. |
| 2008/0088184 | A1 | 4/2008 | Tung et al. |
| 2008/0123170 | A1 | 5/2008 | Reichert et al. |
| 2008/0174461 | A1 | 7/2008 | Hsu |
| 2008/0176681 | A1 | 7/2008 | Donahoe |
| 2008/0181550 | A1 | 7/2008 | Earnshaw |
| 2008/0205461 | A1 | 8/2008 | Henrichs |

(56) References Cited

U.S. PATENT DOCUMENTS

2009/0046746 A1 2/2009 Munroe et al.
2009/0128797 A1 5/2009 Walsh
2009/0195769 A1 8/2009 Luo et al.
2009/0279070 A1 11/2009 Ueno
2009/0309782 A1 12/2009 Takabayashi et al.
2010/0027379 A1 2/2010 Saulnier et al.
2010/0046802 A1 2/2010 Watanabe et al.
2010/0085992 A1 4/2010 Rakuljic et al.
2010/0159858 A1 6/2010 Dent et al.
2010/0187442 A1 7/2010 Hochberg et al.
2010/0271614 A1 10/2010 Albuquerque et al.
2010/0277714 A1 11/2010 Pedersen et al.
2010/0280765 A1 11/2010 Marquardt et al.
2010/0296077 A1 11/2010 Scott et al.
2010/0309391 A1 12/2010 Plut
2011/0026643 A1 2/2011 Ruelke et al.
2011/0068425 A1 3/2011 Liao et al.
2011/0068426 A1 3/2011 Zheng et al.
2011/0091155 A1 4/2011 Yilmaz et al.
2011/0095167 A1 4/2011 Feng et al.
2011/0141471 A1 6/2011 Schlotterbeck et al.
2011/0164845 A1 7/2011 Jenkins et al.
2011/0241895 A1 10/2011 Griffin
2012/0038506 A1 2/2012 Kanamoto et al.
2012/0062230 A1 3/2012 Vaughan, Jr. et al.
2012/0081786 A1 4/2012 Mizuyama et al.
2012/0098935 A1 4/2012 Schmidt et al.
2012/0106579 A1 5/2012 Roos et al.
2012/0120382 A1 5/2012 Silny et al.
2012/0182544 A1 7/2012 Asahara et al.
2012/0206712 A1 8/2012 Chang et al.
2013/0044309 A1 2/2013 Dakin et al.
2013/0044311 A1 2/2013 Rakuljic
2013/0051655 A1 2/2013 Collard et al.
2013/0056623 A1 3/2013 Lipson et al.
2013/0083389 A1 4/2013 Dakin et al.
2013/0094074 A1 4/2013 Asghari et al.
2013/0162976 A1 6/2013 Dakin et al.
2013/0206967 A1 8/2013 Shpunt et al.
2013/0242400 A1 9/2013 Chen
2013/0321791 A1 12/2013 Feldkhun et al.
2014/0035776 A1 2/2014 Sochen et al.
2014/0036252 A1 2/2014 Amzajerdian et al.
2014/0054451 A1 2/2014 Abedin et al.
2014/0112357 A1 4/2014 Abedin et al.
2014/0133864 A1 5/2014 Asghari et al.
2014/0153931 A1 6/2014 Doerr
2014/0169392 A1 6/2014 Kim
2014/0211298 A1 7/2014 Sayyah et al.
2014/0269790 A1 9/2014 Sebastian et al.
2014/0332918 A1 11/2014 Li et al.
2014/0376000 A1 12/2014 Swanson et al.
2014/0376001 A1 12/2014 Swanson
2015/0055115 A1 2/2015 Pedersen et al.
2015/0056740 A1 2/2015 Menezo
2015/0109603 A1 4/2015 Kim et al.
2015/0171593 A1 6/2015 Duan et al.
2015/0177367 A1 6/2015 Sebastian et al.
2015/0177383 A1 6/2015 Ruff et al.
2015/0185244 A1 7/2015 Inoue et al.
2015/0207296 A1 7/2015 Rickman et al.
2015/0260843 A1 9/2015 Lewis
2015/0333480 A1 11/2015 Santis et al.
2015/0346340 A1 12/2015 Yaacobi et al.
2015/0378012 A1 12/2015 Sayyah et al.
2015/0378187 A1 12/2015 Heck et al.
2016/0084945 A1 3/2016 Rodrigo et al.
2016/0161600 A1 6/2016 Eldada et al.
2016/0170141 A1 6/2016 Luo et al.
2016/0209594 A1 7/2016 Bahl
2016/0223663 A1 8/2016 Schmalenberg et al.
2016/0261091 A1 9/2016 Santis et al.
2016/0274226 A1 9/2016 Lewis
2016/0290891 A1 10/2016 Feng et al.
2016/0291135 A1 10/2016 Ando et al.
2016/0299228 A1 10/2016 Maleki et al.
2016/0306043 A1 10/2016 Moss et al.
2016/0324438 A1 11/2016 Halpern et al.
2016/0341818 A1 11/2016 Gilliland et al.
2016/0373191 A1 12/2016 Fathololoumi et al.
2016/0377721 A1 12/2016 Lardin et al.
2016/0377722 A1 12/2016 Lardin et al.
2017/0003451 A1 1/2017 Ma et al.
2017/0040775 A1 2/2017 Takabayashi et al.
2017/0059779 A1 3/2017 Okayama
2017/0067985 A1 3/2017 Schwarz et al.
2017/0098917 A1 4/2017 Popovic et al.
2017/0108649 A1 4/2017 Dallessasse et al.
2017/0139411 A1 5/2017 Hartung et al.
2017/0146639 A1 5/2017 Carothers
2017/0146641 A1 5/2017 Walsh et al.
2017/0153319 A1 6/2017 Villeneuve et al.
2017/0155225 A1 6/2017 Villeneuve et al.
2017/0184450 A1 6/2017 Doylend et al.
2017/0207600 A1 7/2017 Klamkin et al.
2017/0268866 A1 9/2017 Berz
2017/0269198 A1 9/2017 Hall et al.
2017/0269215 A1 9/2017 Hall et al.
2017/0299697 A1 10/2017 Swanson
2017/0299721 A1 10/2017 Eichenholz et al.
2017/0307648 A1 10/2017 Kotake et al.
2017/0307736 A1 10/2017 Donovan
2017/0328988 A1 11/2017 Magee et al.
2017/0343652 A1 11/2017 de Mersseman et al.
2017/0343791 A1 11/2017 Swanson
2017/0350965 A1 12/2017 Schmalenberg
2017/0350983 A1 12/2017 Hall et al.
2017/0356983 A1 12/2017 Jeong et al.
2017/0371227 A1 12/2017 Skirlo et al.
2017/0372602 A1 12/2017 Gilliland et al.
2018/0002432 A1 1/2018 Gilliland et al.
2018/0003805 A1 1/2018 Popovich et al.
2018/0024246 A1 1/2018 Jeong et al.
2018/0031680 A1 2/2018 Lee et al.
2018/0039154 A1 2/2018 Hashemi et al.
2018/0050704 A1 2/2018 Tascione et al.
2018/0073932 A1 3/2018 Minet et al.
2018/0088211 A1 3/2018 Gill et al.
2018/0095284 A1 4/2018 Welch et al.
2018/0102442 A1 4/2018 Wang et al.
2018/0103431 A1 4/2018 Suh et al.
2018/0113216 A1 4/2018 Kremer et al.
2018/0120433 A1 5/2018 Eichenholz et al.
2018/0120436 A1 5/2018 Smits
2018/0136321 A1 5/2018 Verghese et al.
2018/0143322 A1 5/2018 Rosenzweig et al.
2018/0143374 A1 5/2018 Coolbaugh et al.
2018/0149752 A1 5/2018 Tadano
2018/0164408 A1 6/2018 Hall et al.
2018/0172918 A1 6/2018 Lane et al.
2018/0188371 A1 7/2018 Bao et al.
2018/0217471 A1 8/2018 Lee et al.
2018/0224547 A1 8/2018 Crouch et al.
2018/0231643 A1 8/2018 Lee et al.
2018/0269890 A1 9/2018 Ojeda
2018/0287343 A1 10/2018 Morrison et al.
2018/0306925 A1 10/2018 Hosseini et al.
2018/0329037 A1 11/2018 Bozchalooi et al.
2018/0331493 A1 11/2018 Lin et al.
2018/0348343 A1 12/2018 Achour et al.
2018/0351317 A1 12/2018 Vermeulen
2018/0356344 A1 12/2018 Yi
2018/0356522 A1 12/2018 Kikuchi et al.
2018/0356528 A1 12/2018 Schaffner et al.
2018/0359033 A1 12/2018 Xu et al.
2018/0364334 A1 12/2018 Xiang et al.
2018/0364336 A1 12/2018 Hosseini et al.
2018/0372517 A1 12/2018 Yao et al.
2018/0372530 A1 12/2018 Welle et al.
2018/0372870 A1 12/2018 Puglia
2018/0375284 A1 12/2018 Permogorov
2019/0004151 A1 1/2019 Abediasl et al.
2019/0011558 A1 1/2019 Crouch et al.
2019/0011559 A1 1/2019 Desai et al.

(56) References Cited

U.S. PATENT DOCUMENTS

2019/0018110 A1 1/2019 Kremer et al.
2019/0018121 A1 1/2019 Sayyah et al.
2019/0018139 A1 1/2019 Sayyah et al.
2019/0018140 A1 1/2019 Sarkissian et al.
2019/0018144 A1 1/2019 Imaki et al.
2019/0018197 A1 1/2019 Boutami et al.
2019/0025094 A1 1/2019 Lewis et al.
2019/0025426 A1 1/2019 Satyan et al.
2019/0025431 A1 1/2019 Satyan et al.
2019/0027897 A1 1/2019 Wei et al.
2019/0033453 A1 1/2019 Crouch et al.
2019/0049569 A1 2/2019 Kim et al.
2019/0064329 A1 2/2019 Liu et al.
2019/0064332 A1 2/2019 Schmalenberg et al.
2019/0064358 A1 2/2019 Desai et al.
2019/0072651 A1 3/2019 Halmos et al.
2019/0072672 A1 3/2019 Yao
2019/0086514 A1 3/2019 Dussan et al.
2019/0086518 A1 3/2019 Halstig et al.
2019/0086550 A1 3/2019 Dussan et al.
2019/0096259 A1 3/2019 McQuillen et al.
2019/0101647 A1 4/2019 Feshali et al.
2019/0107623 A1 4/2019 Campbell et al.
2019/0120939 A1 4/2019 O'Keeffe
2019/0146074 A1 5/2019 Hjelmstad
2019/0146087 A1 5/2019 Mansur et al.
2019/0146164 A1 5/2019 Krichevsky
2019/0154816 A1 5/2019 Hughes et al.
2019/0154832 A1 5/2019 Maleki et al.
2019/0154835 A1 5/2019 Maleki et al.
2019/0179012 A1 6/2019 Heo
2019/0187269 A1 6/2019 Tong et al.
2019/0201023 A1 7/2019 Shelton, IV et al.
2019/0204419 A1 7/2019 Baba et al.
2019/0204441 A1 7/2019 Feneyrou et al.
2019/0204443 A1 7/2019 Yao et al.
2019/0250253 A1 8/2019 Hung et al.
2019/0250396 A1 8/2019 Blanche et al.
2019/0257924 A1 8/2019 Li et al.
2019/0257927 A1 8/2019 Yao
2019/0265351 A1 8/2019 Madison et al.
2019/0266741 A1 8/2019 Uehara
2019/0271767 A1 9/2019 Keilaf et al.
2019/0280453 A1 9/2019 Gopinath et al.
2019/0293794 A1* 9/2019 Zhang .................. G01S 7/4817
2019/0302262 A1 10/2019 Singer
2019/0302268 A1 10/2019 Singer et al.
2019/0310372 A1 10/2019 Crouch et al.
2019/0310377 A1 10/2019 Lodin et al.
2019/0317195 A1 10/2019 Sun et al.
2019/0331797 A1 10/2019 Singer et al.
2019/0339388 A1 11/2019 Crouch et al.
2019/0339389 A1 11/2019 Russo et al.
2019/0341739 A1 11/2019 Loh et al.
2019/0346056 A1 11/2019 Staiger et al.
2019/0346568 A1 11/2019 Feng et al.
2019/0353787 A1 11/2019 Petit
2019/0353789 A1 11/2019 Boloorian et al.
2019/0353977 A1 11/2019 Hung
2019/0361122 A1 11/2019 Crouch et al.
2019/0369244 A1 12/2019 Asghari et al.
2019/0369251 A1 12/2019 Feng et al.
2019/0372307 A1 12/2019 Morton
2019/0377135 A1 12/2019 Mansouri Rad et al.
2019/0383907 A1 12/2019 Belsley et al.
2019/0391242 A1 12/2019 Asghari et al.
2019/0391243 A1 12/2019 Nicolaescu
2020/0018857 A1 1/2020 Feng et al.
2020/0021082 A1 1/2020 Rakuljic
2020/0025898 A1 1/2020 Ain-Kedem et al.
2020/0025926 A1 1/2020 Asghari et al.
2020/0043176 A1 2/2020 Maila et al.
2020/0049799 A1 2/2020 Ando et al.
2020/0057143 A1 2/2020 Asghari et al.
2020/0064116 A1 2/2020 Salvade et al.
2020/0064477 A1 2/2020 Komatsuzaki
2020/0064483 A1 2/2020 Li et al.
2020/0072978 A1 3/2020 Boloorian et al.
2020/0072979 A1 3/2020 Boloorian et al.
2020/0076152 A1 3/2020 Eichenholz et al.
2020/0088876 A1 3/2020 Tanemura et al.
2020/0103501 A1 4/2020 Kotelnikov et al.
2020/0104647 A1 4/2020 Pirim
2020/0110179 A1 4/2020 Talty et al.
2020/0116837 A1 4/2020 Asghari et al.
2020/0116842 A1 4/2020 Asghari et al.
2020/0116849 A1 4/2020 Wennersten et al.
2020/0116863 A1 4/2020 Jensen et al.
2020/0124711 A1 4/2020 Rezk et al.
2020/0132843 A1 4/2020 Hart et al.
2020/0132849 A1 4/2020 Moebius et al.
2020/0142065 A1 5/2020 Boloorian et al.
2020/0142066 A1 5/2020 Sandborn et al.
2020/0142068 A1 5/2020 Crouch et al.
2020/0150241 A1 5/2020 Byrnes et al.
2020/0158830 A1 5/2020 Asghari et al.
2020/0158833 A1 5/2020 Baba et al.
2020/0158839 A1 5/2020 Lin et al.
2020/0166617 A1 5/2020 Crouch et al.
2020/0166647 A1 5/2020 Crouch et al.
2020/0174095 A1 6/2020 Altintas et al.
2020/0182973 A1 6/2020 Luff et al.
2020/0182978 A1 6/2020 Maleki et al.
2020/0200879 A1 6/2020 Halstig et al.
2020/0209366 A1 7/2020 Maleki
2020/0225332 A1 7/2020 Wagner et al.
2020/0226769 A1 7/2020 Das et al.
2020/0241119 A1 7/2020 Asghari et al.
2020/0249324 A1 8/2020 Steinberg et al.
2020/0249350 A1 8/2020 Schmalenberg
2020/0256956 A1 8/2020 Luff et al.
2020/0278432 A1 9/2020 Thorpe et al.
2020/0284879 A1 9/2020 Asghari et al.
2020/0284883 A1 9/2020 Ferreira et al.
2020/0284913 A1 9/2020 Amelot et al.
2020/0292706 A1 9/2020 Hexsel et al.
2020/0295537 A1 9/2020 Zilkie
2020/0300980 A1 9/2020 Behzadi et al.
2020/0300993 A1 9/2020 Behzadi et al.
2020/0301070 A1 9/2020 Nagarajan
2020/0309949 A1 10/2020 Feng et al.
2020/0309952 A1 10/2020 Imaki et al.
2020/0319314 A1 10/2020 Behzadi et al.
2020/0319409 A1 10/2020 Su et al.
2020/0326476 A1 10/2020 Hiratani
2020/0333441 A1 10/2020 Diaz
2020/0333443 A1 10/2020 Boloorian et al.
2020/0333533 A1 10/2020 Rogers et al.
2020/0363515 A1 11/2020 Luff et al.
2020/0373662 A1 11/2020 Gleason et al.
2020/0379112 A1 12/2020 Ujhara et al.
2020/0379115 A1 12/2020 Yang et al.
2020/0400821 A1 12/2020 Baker et al.
2020/0400822 A1 12/2020 Ando et al.
2020/0408911 A1 12/2020 Boloorian et al.
2020/0408912 A1 12/2020 Boloorian et al.
2021/0010802 A1 1/2021 Onohara et al.
2021/0033732 A1 2/2021 Boloorian et al.
2021/0055388 A1 2/2021 Feng et al.
2021/0063541 A1 3/2021 Zheng et al.
2021/0063542 A1 3/2021 Zheng et al.
2021/0072385 A1 3/2021 Sandborn et al.
2021/0072389 A1 3/2021 Boloorian et al.
2021/0072445 A1 3/2021 Kurokawa et al.
2021/0088657 A1 3/2021 Shah et al.
2021/0096228 A1 4/2021 Behzadi et al.
2021/0109195 A1 4/2021 Feng et al.
2021/0116778 A1 4/2021 Zhang et al.
2021/0132232 A1 5/2021 Asghari et al.
2021/0141058 A1 5/2021 Piggott et al.
2021/0149056 A1 5/2021 Luff et al.
2021/0156997 A1 5/2021 Weinert et al.
2021/0156999 A1 5/2021 Nishino et al.
2021/0159659 A1 5/2021 Bandyopadhyay et al.

(56) References Cited

U.S. PATENT DOCUMENTS

| | | | |
|---|---|---|---|
| 2021/0159664 A1 | 5/2021 | Liu et al. | |
| 2021/0165102 A1 | 6/2021 | Crouch et al. | |
| 2021/0173058 A1 | 6/2021 | Viswanatha et al. | |
| 2021/0181320 A1 | 6/2021 | Oza et al. | |
| 2021/0190907 A1 | 6/2021 | Sahara | |
| 2021/0190921 A1 | 6/2021 | Golikov et al. | |
| 2021/0190925 A1 | 6/2021 | Asghari et al. | |
| 2021/0199797 A1 | 7/2021 | Choi et al. | |
| 2021/0231805 A1 | 7/2021 | Dehlinger et al. | |
| 2021/0239811 A1 | 8/2021 | Asghari et al. | |
| 2021/0255324 A1 | 8/2021 | Dunn et al. | |
| 2021/0278540 A1 | 9/2021 | Maayan et al. | |
| 2021/0293923 A1 | 9/2021 | Arkind et al. | |
| 2021/0293934 A1 | 9/2021 | Sun et al. | |
| 2021/0316756 A1 | 10/2021 | Davydenko | |
| 2021/0318436 A1 | 10/2021 | Boloorian et al. | |
| 2021/0318442 A1 | 10/2021 | Hosseini et al. | |
| 2021/0325520 A1 | 10/2021 | Cai et al. | |
| 2021/0333386 A1 | 10/2021 | Park et al. | |
| 2021/0349196 A1 | 11/2021 | Wang et al. | |
| 2021/0349216 A1 | 11/2021 | Behroozpour et al. | |
| 2021/0356592 A1 | 11/2021 | Behroozpour | |
| 2021/0364607 A1 | 11/2021 | Davydenko | |
| 2021/0373137 A1 | 12/2021 | Tan et al. | |
| 2021/0373162 A1 | 12/2021 | Wu et al. | |
| 2021/0389244 A1 | 12/2021 | Bowman et al. | |
| 2021/0396879 A1 | 12/2021 | Sun et al. | |
| 2021/0405194 A1 | 12/2021 | Tsuchida | |
| 2022/0003842 A1 | 1/2022 | Wang et al. | |
| 2022/0006260 A1 | 1/2022 | Lipson et al. | |
| 2022/0043151 A1 | 2/2022 | Baker et al. | |
| 2022/0050187 A1 | 2/2022 | Yao | |
| 2022/0065999 A1 | 3/2022 | Phare et al. | |
| 2022/0066017 A1 | 3/2022 | Gipson | |
| 2022/0075121 A1 | 3/2022 | Lowder et al. | |
| 2022/0082696 A1 | 3/2022 | Kjellman et al. | |
| 2022/0085567 A1 | 3/2022 | Lowder et al. | |
| 2022/0099837 A1 | 3/2022 | Crouch et al. | |
| 2022/0107411 A1 | 4/2022 | Koonath et al. | |
| 2022/0113390 A1 | 4/2022 | Koonath et al. | |
| 2022/0113422 A1 | 4/2022 | Hillard et al. | |
| 2022/0121080 A1 | 4/2022 | Yao | |
| 2022/0179055 A1 | 6/2022 | Ferrara et al. | |
| 2022/0187457 A1 | 6/2022 | Daami et al. | |
| 2022/0187458 A1 | 6/2022 | Piggott et al. | |
| 2022/0187463 A1 | 6/2022 | Maheshwari et al. | |
| 2022/0196814 A1 | 6/2022 | Lin et al. | |
| 2022/0206164 A1 | 6/2022 | Takada | |
| 2022/0244360 A1 | 8/2022 | Phare et al. | |
| 2022/0283389 A1 | 9/2022 | Yang et al. | |
| 2022/0291361 A1 | 9/2022 | Asghari et al. | |
| 2022/0308192 A1 | 9/2022 | John et al. | |
| 2022/0334225 A1 | 10/2022 | Davydenko et al. | |
| 2022/0342048 A1 | 10/2022 | Asghari et al. | |
| 2022/0342078 A1 | 10/2022 | Rakuljic et al. | |
| 2022/0365214 A1 | 11/2022 | Sandborn et al. | |
| 2022/0373667 A1 | 11/2022 | Khatana et al. | |
| 2022/0373739 A1 | 11/2022 | Abril et al. | |
| 2022/0404470 A1 | 12/2022 | Asghari et al. | |
| 2022/0413100 A1 | 12/2022 | Jain | |
| 2022/0413143 A1 | 12/2022 | Parsa et al. | |
| 2023/0027271 A1 | 1/2023 | Jin et al. | |
| 2023/0069201 A1 | 3/2023 | Asghari et al. | |
| 2023/0104453 A1 | 4/2023 | Asghari et al. | |
| 2023/0194952 A1 | 6/2023 | Muranaka et al. | |
| 2023/0228878 A1 | 7/2023 | Asghari et al. | |
| 2023/0258861 A1 | 8/2023 | Vercruysse et al. | |
| 2023/0266466 A1 | 8/2023 | Ummethala et al. | |
| 2023/0288566 A1 | 9/2023 | Nadkarni et al. | |
| 2023/0296732 A1 | 9/2023 | Xiao | |
| 2024/0012112 A1 | 1/2024 | Warke et al. | |
| 2024/0012147 A1 | 1/2024 | Tavallaee et al. | |
| 2024/0255618 A1 | 8/2024 | Asghari et al. | |
| 2025/0044448 A1* | 2/2025 | Spalink | G01S 17/58 |
| 2025/0085401 A1 | 3/2025 | Zhou et al. | |
| 2025/0094380 A1 | 3/2025 | Mazed | |
| 2025/0130316 A1 | 4/2025 | Asghari et al. | |

FOREIGN PATENT DOCUMENTS

| | | | |
|---|---|---|---|
| CN | 101258420 | A | 9/2008 |
| CN | 101356450 | A | 1/2009 |
| CN | 102565788 | A | 7/2012 |
| CN | 103874945 | A | 6/2014 |
| CN | 104135305 | A | 11/2014 |
| CN | 104459881 | A | 3/2015 |
| CN | 104466640 | A | 3/2015 |
| CN | 204479750 | U | 7/2015 |
| CN | 105589074 | A | 5/2016 |
| CN | 105680320 | A | 6/2016 |
| CN | 105917257 | A | 8/2016 |
| CN | 106062583 | A | 10/2016 |
| CN | 106154248 | A | 11/2016 |
| CN | 106410607 | A | 2/2017 |
| CN | 106773028 | A | 5/2017 |
| CN | 106842232 | A | 6/2017 |
| CN | 106959439 | A | 7/2017 |
| CN | 107144847 | A | 9/2017 |
| CN | 107305184 | A | 10/2017 |
| CN | 107367734 | A | 11/2017 |
| CN | 107923976 | A | 4/2018 |
| CN | 107976666 | A | 5/2018 |
| CN | 108139465 | A | 6/2018 |
| CN | 108291970 | A | 7/2018 |
| CN | 108603758 | A | 9/2018 |
| CN | 108761398 | A | 11/2018 |
| CN | 109254296 | A | 1/2019 |
| CN | 109471129 | A | 3/2019 |
| CN | 109642952 | A | 4/2019 |
| CN | 110036276 | A | 7/2019 |
| CN | 107192355 | B | 8/2019 |
| CN | 110161516 | A | 8/2019 |
| CN | 110187350 | A | 8/2019 |
| CN | 110412685 | A | 11/2019 |
| CN | 110806579 | A | 2/2020 |
| CN | 111007533 | A | 4/2020 |
| CN | 111338025 | A | 6/2020 |
| CN | 112241014 | A | 1/2021 |
| CN | 114419152 | A | 4/2022 |
| CN | 110764074 | B | 6/2022 |
| DE | 10 2015 222061 | A1 | 5/2017 |
| DE | 10 2017 200795 | A1 | 7/2018 |
| DE | 102018101935 | A1 | 8/2018 |
| DE | 10 2017 106 226 | A1 | 9/2018 |
| DE | 102019124598 | A1 | 3/2020 |
| EP | 0 523 921 | A1 | 1/1993 |
| EP | 2796890 | A1 | 10/2014 |
| EP | 2955542 | B1 | 4/2017 |
| EP | 3276371 | A1 | 1/2018 |
| EP | 3339924 | A1 | 6/2018 |
| EP | 3259615 | B1 | 11/2019 |
| EP | 3719537 | A1 | 10/2020 |
| EP | 3 584 893 | B1 | 6/2021 |
| EP | 3889644 | A1 | 10/2021 |
| GB | 1 585 053 | A | 2/1981 |
| GB | 2173664 | A | 10/1986 |
| GB | 2586499 | A | 2/2021 |
| JP | S53-123004 | A | 10/1978 |
| JP | H05-158096 | A | 6/1993 |
| JP | H07-5261 | A | 1/1995 |
| JP | H07-89147 | B2 | 9/1995 |
| JP | H09-33872 | A | 2/1997 |
| JP | H1010227 | A | 1/1998 |
| JP | 2003224321 | A | 8/2003 |
| JP | 2004-151022 | A | 5/2004 |
| JP | 2007064803 | A | 3/2007 |
| JP | 2007184511 | A | 7/2007 |
| JP | 2008160130 | A | 7/2008 |
| JP | 2008292370 | A | 12/2008 |
| JP | 2009-115696 | A | 5/2009 |
| JP | 2010151806 | A | 7/2010 |
| JP | 2010271624 | A | 12/2010 |
| JP | 2012146787 | A | 8/2012 |

(56) References Cited

FOREIGN PATENT DOCUMENTS

| | | | |
|---|---|---|---|
| JP | 2013165407 | A | 8/2013 |
| JP | 2014202716 | A | 10/2014 |
| JP | 2015-018640 | A | 1/2015 |
| JP | 2015092184 | A | 5/2015 |
| JP | 2015-517094 | A | 6/2015 |
| JP | 2015172540 | A | 10/2015 |
| JP | 2015180735 | A | 10/2015 |
| JP | 2015230259 | A | 12/2015 |
| JP | 2016111087 | A | 6/2016 |
| JP | 2016-525209 | A | 8/2016 |
| JP | 5975203 | B2 | 8/2016 |
| JP | 2017502315 | A | 1/2017 |
| JP | 2017097340 | A | 6/2017 |
| JP | 2017106897 | A | 6/2017 |
| JP | 2017524918 | A | 8/2017 |
| JP | 2017161484 | A | 9/2017 |
| JP | 2017-198514 | A | 11/2017 |
| JP | 2017-211348 | A | 11/2017 |
| JP | 2018511054 | A | 4/2018 |
| JP | 2018-512600 | A | 5/2018 |
| JP | 2018520346 | A | 7/2018 |
| JP | 2018529955 | A | 10/2018 |
| JP | 2018188284 | A | 11/2018 |
| JP | 2018200273 | A | 12/2018 |
| JP | 2019502925 | A | 1/2019 |
| JP | 2019095218 | A | 6/2019 |
| JP | 2019525195 | A | 9/2019 |
| JP | 2019-203977 | A | 11/2019 |
| JP | 2019-537012 | A | 12/2019 |
| JP | 2020-012641 | A | 1/2020 |
| JP | 2020-16639 | A | 1/2020 |
| JP | 2020-34546 | A | 3/2020 |
| JP | 2002090457 | A | 3/2020 |
| JP | 2020085723 | A | 6/2020 |
| JP | 2021004800 | A | 1/2021 |
| JP | 2021032848 | A | 3/2021 |
| JP | 7397009 | B2 | 12/2023 |
| KR | 20060086182 | A | 7/2006 |
| KR | 10-2015-0045735 | A | 4/2015 |
| KR | 20180013598 | A | 2/2018 |
| KR | 101 931 022 | B1 | 12/2018 |
| WO | 97/11396 | A1 | 3/1997 |
| WO | 2010123182 | A1 | 10/2010 |
| WO | 2010127151 | A1 | 11/2010 |
| WO | 2012123668 | A1 | 9/2012 |
| WO | 2012153309 | A2 | 11/2012 |
| WO | 2013/049579 | A1 | 4/2013 |
| WO | 2014/203654 | A1 | 12/2014 |
| WO | 2014/206630 | A1 | 12/2014 |
| WO | 2015/044370 | A1 | 4/2015 |
| WO | 2015/058209 | A1 | 4/2015 |
| WO | 2015/098027 | A1 | 7/2015 |
| WO | 2015/200800 | A1 | 12/2015 |
| WO | 2016/024332 | A1 | 2/2016 |
| WO | 2016/097409 | A2 | 6/2016 |
| WO | 2017/023107 | A1 | 2/2017 |
| WO | 2017/083597 | A1 | 5/2017 |
| WO | 2017/095817 | A1 | 6/2017 |
| WO | 2017/102156 | A1 | 6/2017 |
| WO | 2017/187510 | A1 | 11/2017 |
| WO | 2017/216581 | A1 | 12/2017 |
| WO | 2018/003852 | A1 | 1/2018 |
| WO | 2018/036946 | A1 | 3/2018 |
| WO | 2018/060318 | A1 | 4/2018 |
| WO | 2018/116412 | A1 | 6/2018 |
| WO | 2018/160240 | A2 | 9/2018 |
| WO | 2018/170478 | A1 | 9/2018 |
| WO | 2018/230474 | A1 | 12/2018 |
| WO | 2019/010320 | A1 | 1/2019 |
| WO | 2019/018894 | A1 | 1/2019 |
| WO | 2019/121069 | A1 | 6/2019 |
| WO | 2019/130472 | A1 | 7/2019 |
| WO | 2019/149815 | A1 | 8/2019 |
| WO | 2019/196135 | A1 | 10/2019 |
| WO | 2019/217761 | A1 | 11/2019 |
| WO | 2019/217857 | A1 | 11/2019 |
| WO | 2019/236430 | A1 | 12/2019 |
| WO | 2019/236464 | A1 | 12/2019 |
| WO | 2020/005537 | A1 | 1/2020 |
| WO | 2020/033161 | A1 | 2/2020 |
| WO | 2020/046513 | A1 | 3/2020 |
| WO | 2020/076566 | A1 | 4/2020 |
| WO | 2020/110779 | A1 | 6/2020 |
| WO | 2020/129284 | A1 | 6/2020 |
| WO | 2020/167515 | A1 | 8/2020 |
| WO | 2020/190491 | A1 | 9/2020 |
| WO | 2020/205450 | A1 | 10/2020 |
| WO | 2020/234797 | A1 | 11/2020 |
| WO | 2020/251633 | A1 | 12/2020 |
| WO | 2021/024038 | A1 | 2/2021 |
| WO | 2021/252894 | A1 | 12/2021 |
| WO | 2022/013422 | A1 | 1/2022 |
| WO | 2022/233503 | A1 | 11/2022 |
| WO | 2023/006470 | A1 | 2/2023 |
| WO | 2023/118295 | A1 | 6/2023 |

OTHER PUBLICATIONS

Satyan, N. et al, "Precise control of broadband frequency chirps using optoelectronic feedback," Optics Express, Aug. 31, 2009, vol. 17, No. 18, pp. 15991-15999.

Schulmeister, Karl, "White Paper the new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

(56) References Cited

OTHER PUBLICATIONS

Xu et al., "Methods and applications of on-chip beam splitting: A review", Frontiers in Physics, Sep. 6, 2022, 16 pages.
Yao et al., "Non-mechanical Lidar beamforming enabled by combined wavelength-division- and time-division-multiplexing", Available at SSRN.com, Oct. 5, 2022, 13 pages, https://ssrn.com/abstract=4238741 or http://dx.doi.org/10.2139/ssrn.4238741.
Zhu et al., "Dual-Comb Ranging", Engineering, 4, Oct. 16, 2018, pp. 772-778.
Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Amzajerdian et al., "Demonstration of Coherent Doppler Lidar for Navigation in GPS-Denied Environments", Laser Radar Technology and Applications XXII, SPIE Defense and Security, Apr. 9-13, 2017, vol. 10191, 1019102.
Anderson et al., "ladar: Frequency-Modulated Continuous Wave Laser Detection and Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Banzhaf et al., "Phase-Coded FMCW Lidar", 2021 29th European Signal Processing Conference (EUSIPCO), EURASIP, Aug. 23, 2021, XX034038479, pp. 1775-1779, retrieved on Nov. 15, 2021.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Chang et al., "A review of UAV autonomous navigation in GPS-denied environments", Robots and Autonomous Systems, Dec. 2023, 170, 104533, 23 pages.
Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Ellis, Jonathan D., "Field Guide to Displacement Measuring Interferometry", SPIE Field Guides, vol. FG30, Jan. 7, 2014, 155 pages.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Ince et al., "An S-band frequency-modulated continuous-wave boundary layer profiler: Description and initial results", Radio Science, Aug. 5, 2003, vol. 38, Issue 4, 1072, 10 pages.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Kobayashi, Miki, International Preliminary Report on Patentability and Written Opinion, PCT/US2024/035659, the International Bureau of WIPO, Jan. 15, 2026.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
LIDAR vs Radar: https://4sense.medium.com/lidar-vs-radar-312119b9eac4, 2022, 17 pages.
Lu, Z., "Silicon Photonic Switches for Optical Communication Applications", PhD Thesis. University of British Columbia, Sep. 29, 2017, 165 pages.
Nevlacsil et al., "Multi-channel swept source optical coherence tomography concept based on photonic integrated circuits", Optics Express, Oct. 26, 2020, vol. 28, No. 22, pp. 32468-32482.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.

(56) References Cited

OTHER PUBLICATIONS

Poulton, Christopher V. et al., “Coherent Solid-State LIDAR with Silicon Photonic Optical Phased Arrays”, pp. 4091-4094, Oct. 15, 2017, Optics Letters, vol. 42, No. 20.
Rablau, “LIDAR—A new (self-driving) vehicle for introducing optics to broader engineering and non-engineering audiences”, in Fifteenth Conference on Education and Training in Optics and Photonics 2019, May 21-24, 2019, Quebec City, Quebec, Optica Publishing Group 2019, Paper 11143_138 (14 pages).
Royo et al., “An Overview of LIDAR Imaging Systems for Autonomous Vehicles”, Appl. Sci., Sep. 30, 2019, 9(19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, “FMCW Lidar: Scaling to the Chip-Level and Improving Phase-Noise-Limited Performance”, Fall 2017, 18 pages.

* cited by examiner

SIGNAL CHIRP IN LIDAR OUTPUT SIGNALS

FIELD

The invention relates to optical devices. In particular, the invention relates to LIDAR systems.

BACKGROUND

There is an increasing commercial demand for LIDAR systems that can be deployed in applications such as ADAS (Advanced Driver Assistance Systems) and AR (Augmented Reality). LIDAR (Light Detection and Ranging) systems typically output a system output signal that is reflected by an object located outside of the LIDAR system. At least a portion of the reflected light signal returns to the LIDAR system. The LIDAR system directs the received light signal to a light sensor that converts the light signal to an electrical signal. Electronics can use the light sensor output to quantify LIDAR data that indicates the radial velocity and/or distance between the object and the LIDAR system.

Many LIDAR systems tune the frequency of the system output signal linearly or with other well-defined waveforms versus time to enable the accurate measurement of LIDAR data. However, the frequency of the system output often wanders away from the desired waveform. The frequency of the system output signal wandering away from the desired waveform is a source of error in the LIDAR data. As a result, there is a need for improving the generation of LIDAR data.

SUMMARY

A LIDAR system transmits a system output signal from the LIDAR system such that a sample region is illuminated by the system output signal. The LIDAR system includes a first light signal combiner configured to combine light that returns to the LIDAR system from the system output signal with light from a reference signal so as to generate a composite signal beating at a composite beat frequency. The LIDAR system including a local light signal combiner configured to combine a first local signal with a second local signal so as to generate a local beating signal beating at a local beat frequency. The reference signal, the system output signal, the first local signal, and the second local signal each includes light from an outgoing LIDAR signal. The LIDAR system also includes electronics that perform a calculation of LIDAR data for the sample region. The LIDAR data for the sample region includes the distance between the LIDAR system and an object in the sample region and/or a radial velocity between the LIDAR system and the object in the sample region. A variable in the calculation is a normalized beat frequency. The normalized beat frequency is the composite beat frequency normalized by a normalizing local beat frequency that is a function of the local beat frequency.

A method includes causing a LIDAR system to transmit a system output signal from the LIDAR system such that a sample region is illuminated by the system output signal. The method also includes combining light that returns to the LIDAR system from the system output signal with light from a reference signal so as to generate a composite signal beating at a composite beat frequency. The method further includes combining a first local signal with a second local signal so as to generate a local beating signal beating at a local beat frequency. The reference signal, the system output signal, the first local signal, and the second local signal each includes light from an outgoing LIDAR signal. The method further includes performing a calculation of LIDAR data for the sample region. The LIDAR data for the sample region includes the distance between the LIDAR system and an object in the sample region and/or a radial velocity between the LIDAR system and the object in the sample region. A variable in the calculation is a normalized beat frequency. The normalized beat frequency is the composite beat frequency normalized by a normalizing local beat frequency that is a function of the local beat frequency.

BRIEF DESCRIPTION OF THE FIGURES

FIG. 6A illustrates an interface between optical components and light sensors that can be positioned on a LIDAR chip.

FIG. 6B is a schematic of the relationship between the electronics and light sensors that can be included on a LIDAR chip.

DESCRIPTION

A system output signal is transmitted from a LIDAR system such that a sample region is illuminated by the system output signal. Light that returns to the LIDAR system from the system output signal is combined with light from a reference signal so as to generate a composite signal beating at a composite beat frequency. Additionally, a first local signal is combined with a second local signal so as to generate a local beating signal beating at a local beat frequency. The distance between the LIDAR system and an object in the sample region is calculated from a normalized beat frequency where the composite beat frequency is normalized by the local beat frequency.

The outgoing LIDAR signal is chirped such that the system output signal is chirped. The reference signal, the system output signal, the first local signal, and the second local signal each includes light from an outgoing LIDAR signal. Additionally, the reference signal, the first local signal, and the second local signal do not exit from the LIDAR system. As a result, the normalization of the composite beat frequency by the normalizing local beat frequency provides a normalized beat frequency that dynamically compensates for differences between the desired frequency versus time waveform for the system output signal and the actual frequency versus time waveform for the system output signal.

Figure 1A:
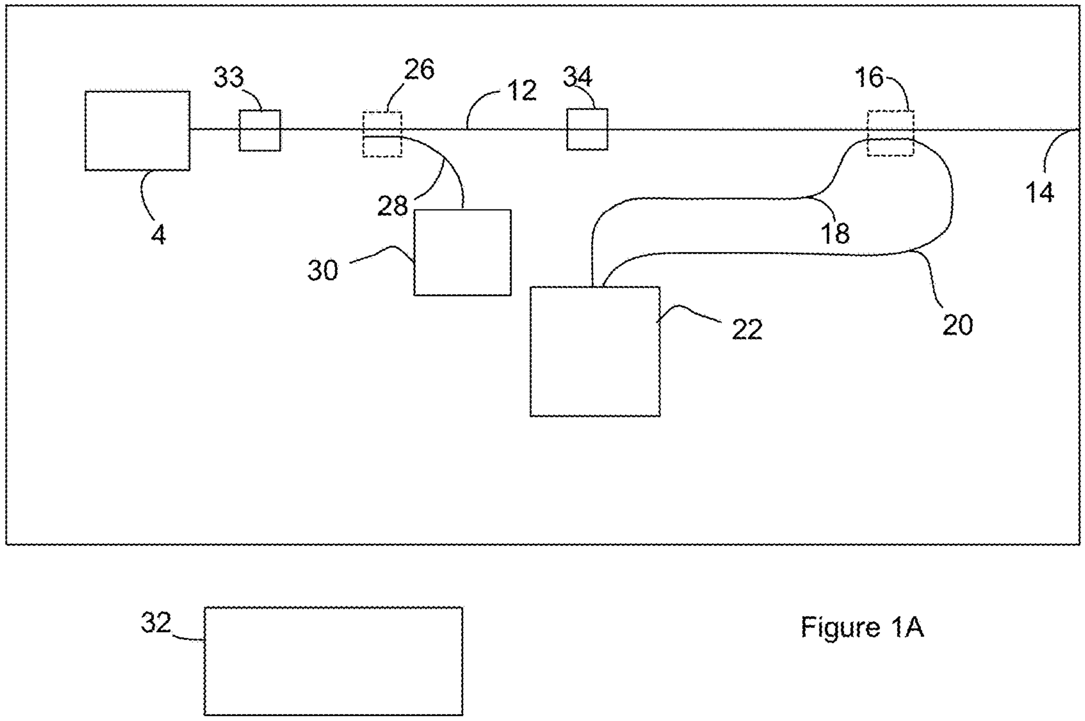
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to an optical signal processor 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MMI) devices.

The utility waveguide 12 also carries the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the optical signal processor 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the optical signal processor 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a local branch suitable for use in generating a normalized beat frequency and/or controlling operation of the light source 4. The local branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MMI) devices.

The control waveguide 28 carries the tapped signal to local optical components 30. The local components 30 can be in electrical communication with electronics 32. All or a portion of the local components 30 can be included in the electronics 32. When the local branch is used in controlling operation of the light source 4, the electronics can employ output from the local components 30 to control a process variable of one, two, or three controlled light signals selected from the group consisting of the tapped signal, the system output signal, and the outgoing LIDAR signal. Examples of the suitable process variables include the frequency of the controlled light signal and/or the phase of the controlled light signal. When the local branch is used in generating a normalized beat frequency, the electronics can employ output from the local optical components 30 to calculate a local beat frequency that is a variable used in calculating the normalized beat frequency.

Figure 1B:
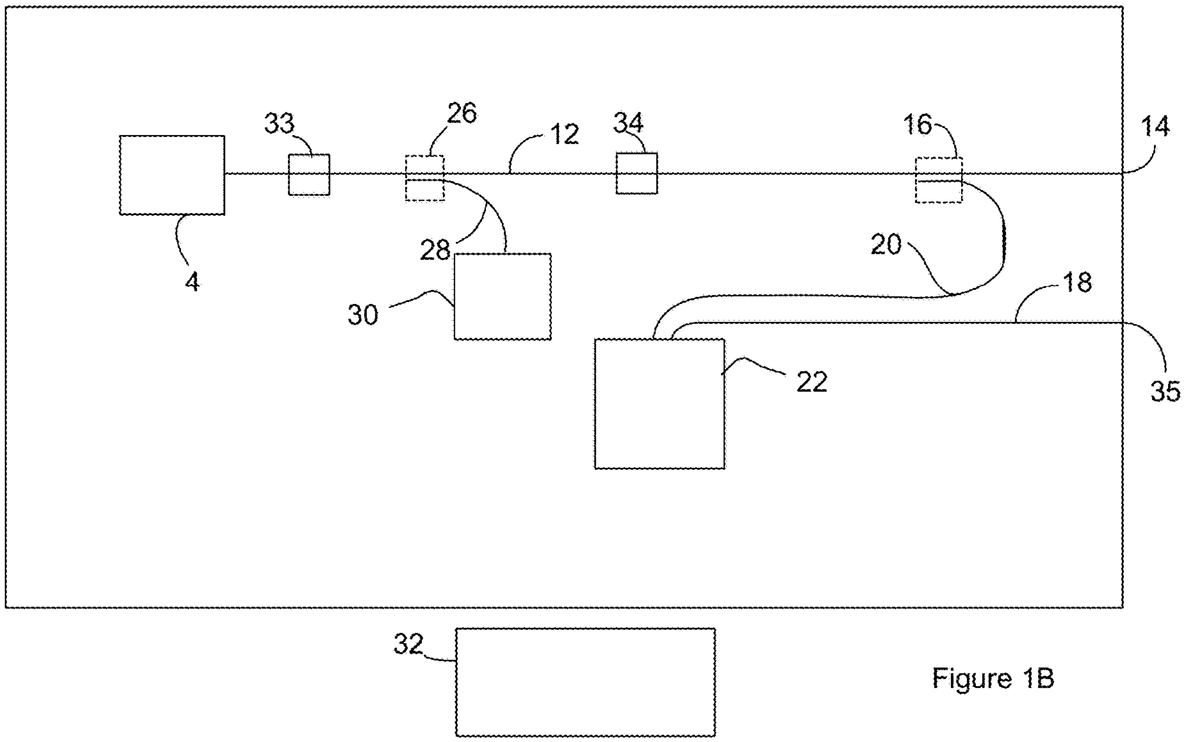
FIG. 1B is a topview of a schematic of a LIDAR system that includes or consists of a LIDAR chip that outputs a LIDAR output signal and receives a LIDAR input signal on different waveguides.

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to an optical signal processor 22 for further processing. As described in the context of FIG. 1A, the reference waveguide 20 carries the reference signal to the optical signal processor 22 for further processing. As will be described in more detail below, the optical signal processor 22 combines the comparative signal with the reference signal to form a composite signal that carries LIDAR data for a sample region on the field of view.

Figure 1C:
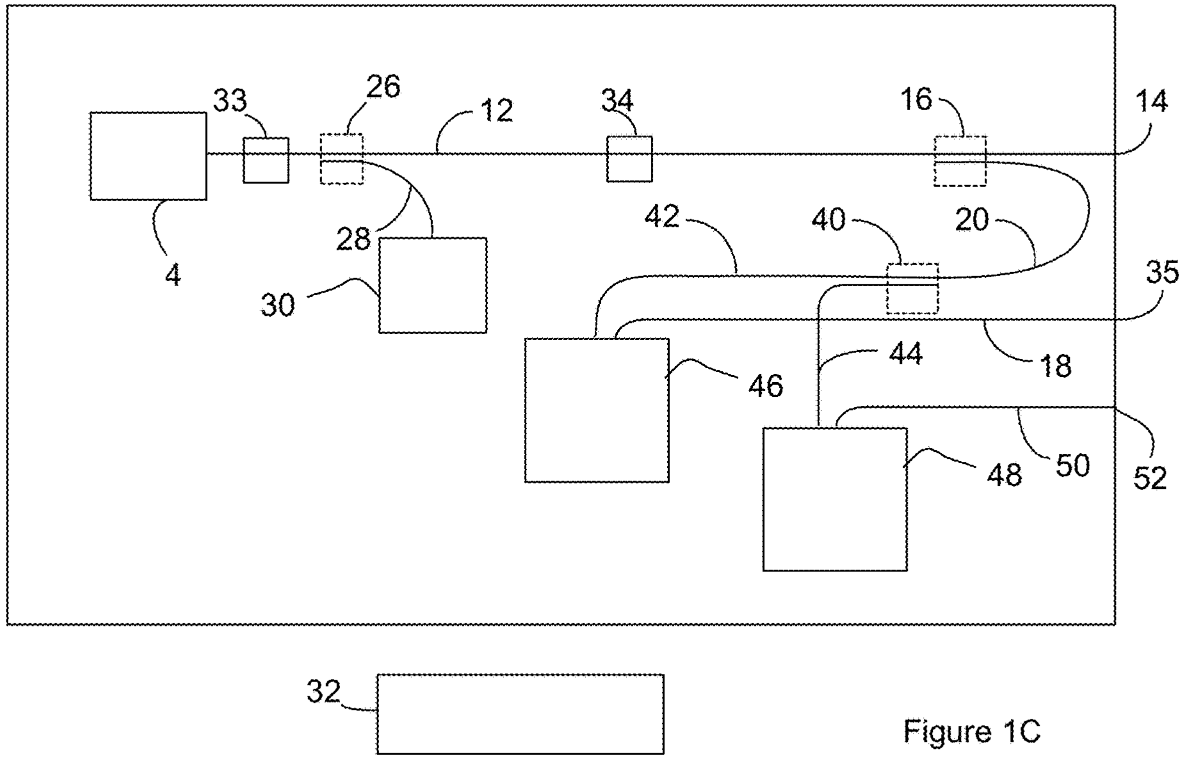
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first optical signal processor 46 and the second reference waveguide 44 carries the second reference signal to a second optical signal processor 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more objects located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first optical signal processor 46 for further processing.

Additionally, when light from the LIDAR output signal is reflected by one or more objects located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second optical signal processor 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
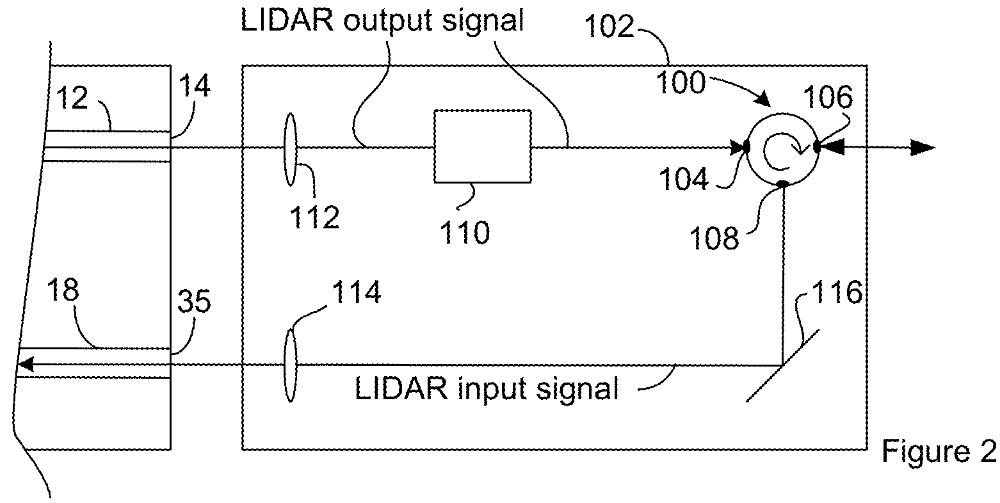
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
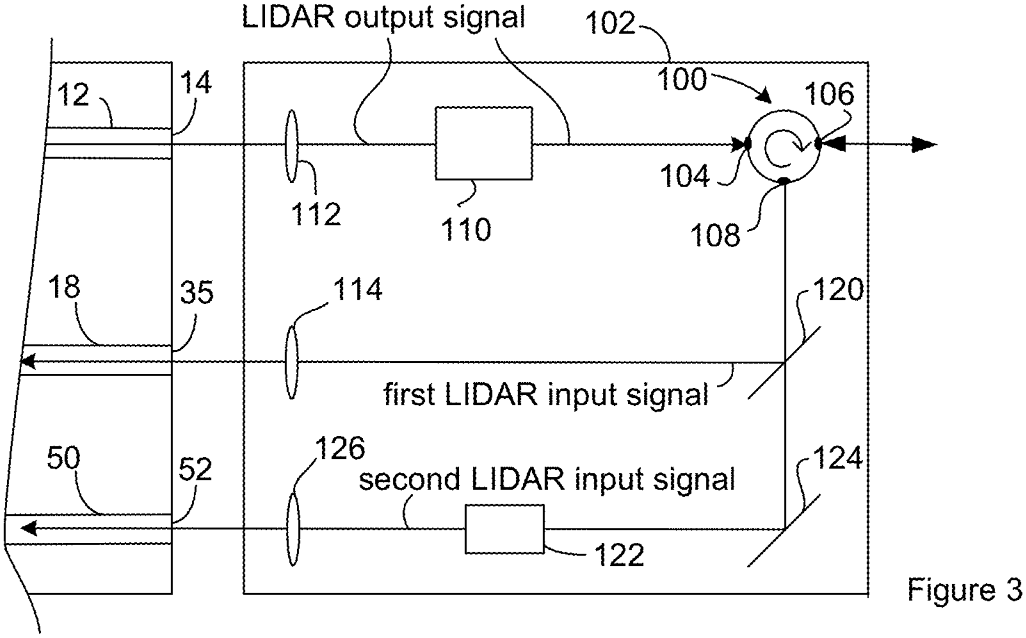
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can be linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first optical signal processor 46 and second composite signals generated by the second optical signal processor 48 each result from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e., first composite signals and the second composite signal) from the sample region. In some instances, determining the LIDAR data for the sample region includes the electronics combining the LIDAR data from different composite signals (i.e., the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e., the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
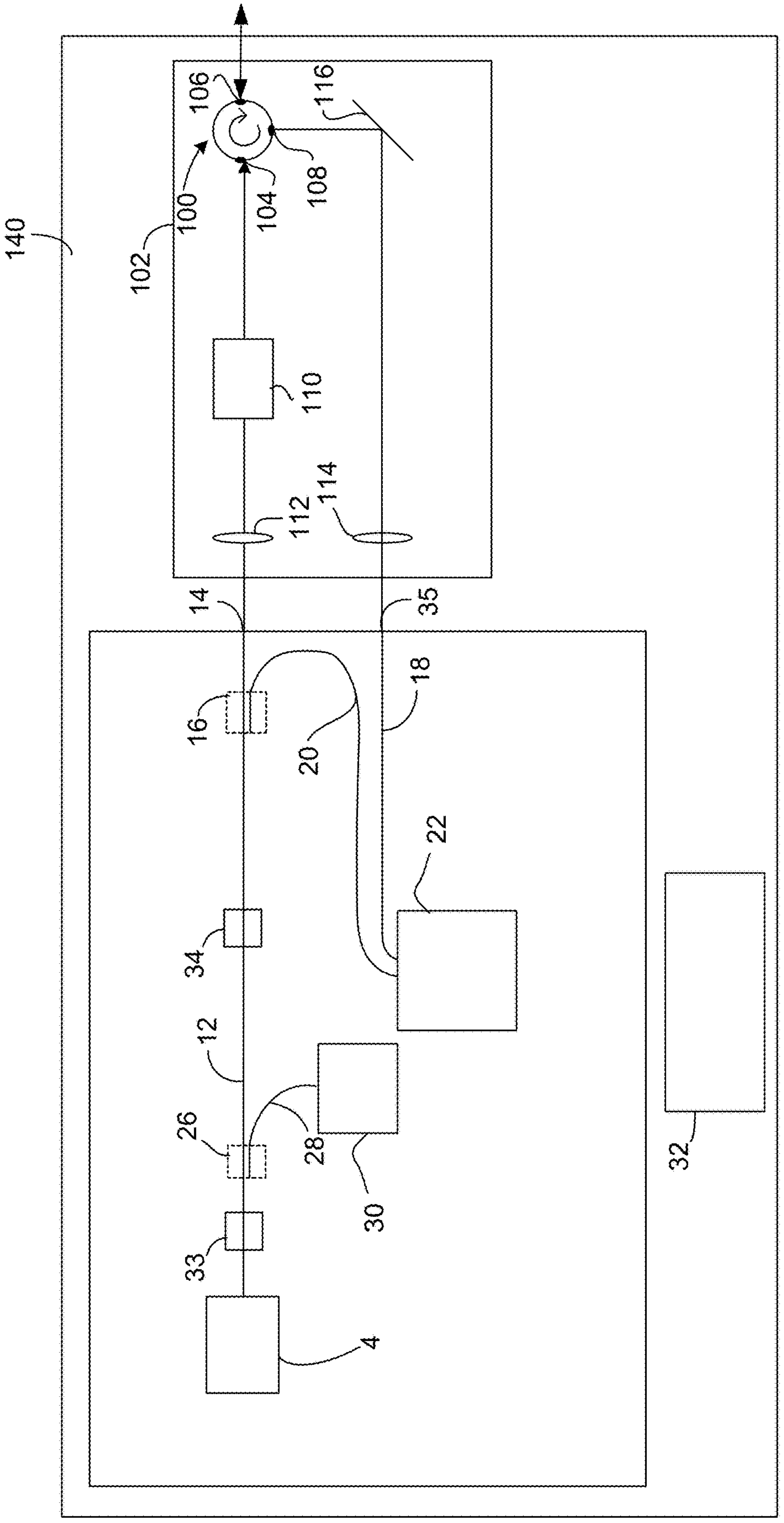
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receives a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view and can accordingly serve as three-dimensional pixels within the field of view. For instance, the field of view of for the LIDAR system includes or consists of the space occupied by the combination of the sample regions.

Figure 5A:
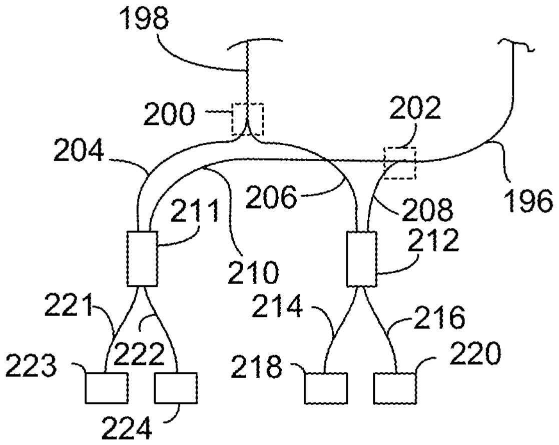
FIG. 5A illustrates an example of local optical components suitable for use with the LIDAR systems.
Figure 5B:
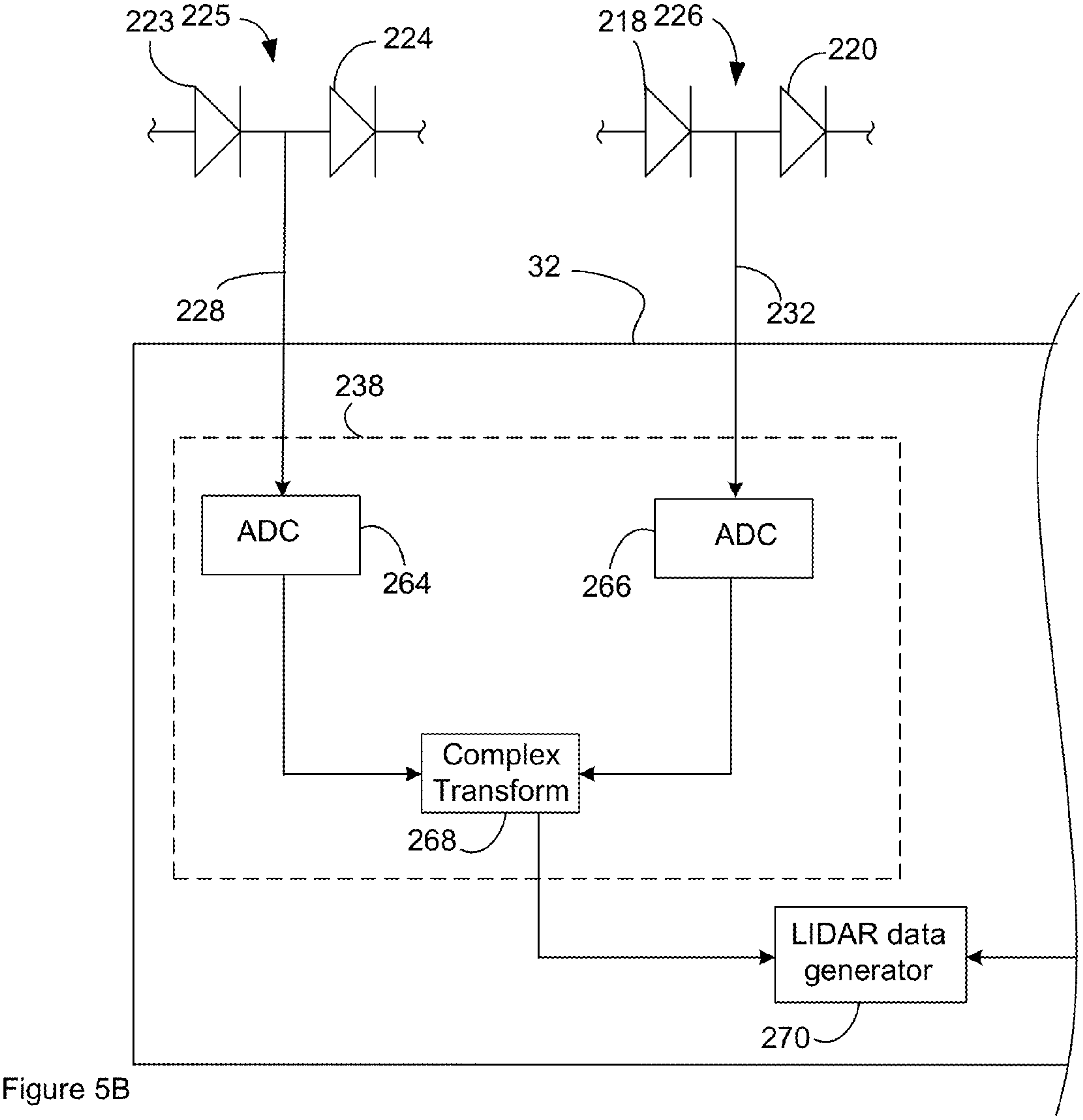
FIG. 5B provides a schematic of electronics that are suitable for use with local optical components configured according to FIG. 5A.
Figure 5C:
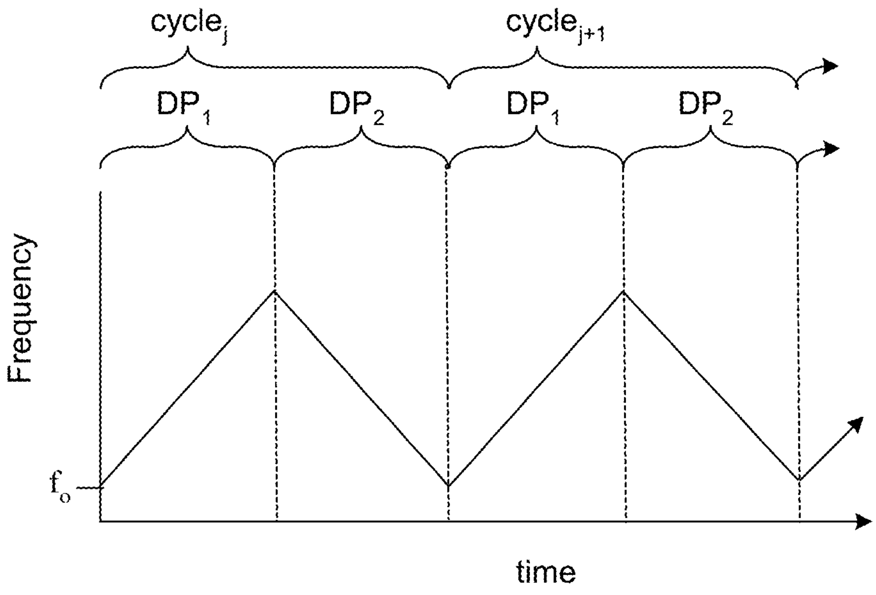
FIG. 5C is a graph of frequency versus time for a system output signal with triangular frequency tuning.

FIG. 5A through FIG. 5C illustrate an example of a suitable optical signal processor for use as all or a fraction of the optical signal processors selected from the group consisting of the optical signal processor 22, the first optical signal processor 46 and the second optical signal processor 48. The optical signal processor receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The optical signal processor includes a second splitter 200 that divides the comparative signal carried on the comparative waveguide 196 onto a first comparative waveguide 204 and a second comparative waveguide 206. The first comparative waveguide 204 carries a first portion of the comparative signal to the light signal combiner 211. The second comparative waveguide 208 carries a second portion of the comparative signal to the second light signal combiner 212.

The optical signal processor includes a first splitter 202 that divides the reference signal carried on the reference waveguide 198 onto a first reference waveguide 204 and a second reference waveguide 206. The first reference waveguide 204 carries a first portion of the reference signal to the light signal combiner 211. The second reference waveguide 208 carries a second portion of the reference signal to the second light signal combiner 212.

The second light signal combiner 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light signal combiner 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light signal combiner 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light signal combiner 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light signal combiner 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light signal combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light signal combiner 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light signal combiner 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light signal combiner 212 splits the second composite signal such that the portion of the comparative signal in the first portion of the second composite signal is phase shifted by 180° relative to the portion of the comparative signal in the second portion of the second composite signal, the light signal combiner 211 also splits the composite signal such that the portion of the comparative signal in the first portion of the composite signal is phase shifted by 180° relative to the portion of the comparative signal in the second portion of the composite signal. When the second light signal combiner 212 splits the second composite signal such that the portion of the reference signal in the first portion of the second composite signal is phase shifted by 180° relative to the portion of the reference signal in the second portion of the second composite signal, the light signal combiner 211 also splits the composite signal such that the portion of the reference signal in the first portion of the composite signal is phase shifted by 180° relative to the portion of the reference signal in the second portion of the composite signal.

Suitable light signal combiners 211 and second light signal combiners 212 include, but are not limited to, Multi-Mode Interference couplers, directional couplers, and tapered couplers.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e., the beating in the first composite signal and in the second composite signal.

The electronics 32 includes a data transformer 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The data transformer 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The data transformer 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The data transformer 238 includes a mathematical transformer 268 that receives the complex data signal. For instance, the mathematical transformer 268 receives the first digital data signal from the first Analog-to-Digital Converter (ADC) 264 as an input and also receives the second digital data signal from the second Analog-to-Digital Converter (ADC) 266 as an input. The mathematical transformer 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip.

The mathematical transformer 268 can include a peak finder (not shown) configured to identify peaks in the output of the mathematical transformer 268. The peak finder can be configured to identify any frequency peaks associated with reflection of the system output signal by one or more objects located outside of the LIDAR system. For instance, frequency peaks associated with reflection of the system output signal by one or more objects located outside of the LIDAR system can fall within a frequency range. The peak finder can identify the frequency peak within the range of frequencies associated with the reflection of the system output signal by one or more objects located outside of the LIDAR system. The frequency of the identified frequency peak represents the beat frequency of the composite signal. The mathematical transformer 268 can execute the attributed functions using firmware, hardware or software or a combination thereof.

The electronics 32 include a LIDAR data generator 270 that receives the beat frequency of the composite signal from the mathematical transformer 268. For instance, the LIDAR data generator 270 can receive the beat frequency of the composite signal from the peak finder. The LIDAR data generator 270 processes the beat frequency of the composite signal so as to generate the LIDAR data (distance and/or radial velocity between the reflecting object and the LIDAR chip or LIDAR system). The LIDAR data generator 270 can execute the attributed functions using firmware, hardware or software or a combination thereof.

FIG. 5C shows an example of a relationship between the frequency of the system output signal, time, cycles and data periods. The base frequency of the system output signal ($f_o$) can be the frequency of the system output signal at the start of a cycle. The illustrated frequency versus time pattern is an example and other frequency versus time patterns can be used in conjunction with the use of normalized beat frequencies. As non-limiting examples, the frequency versus time pattern can be a sawtooth waveform with slow up-chirp and fast down chirp, or can be multi-segment, with two segments of shallow up-chirps and one down-chirp. The use of the normalized beat frequency can apply to each of the different patterns independent of the modulation pattern. Additionally, the illustrated frequency versus time pattern can include additional data periods in the cycles. The data periods in the cycles of the illustrated frequency versus time pattern each result in a composite signal beat frequency used in the example calculation of LIDAR data as described below.

FIG. 5C shows frequency versus time for a sequence of two cycles labeled $cycle_j$ and $cycle_{j+1}$. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes K data periods that are each associated with a period index k and are labeled $DP_k$. In the example of FIG. 5C, each cycle includes two data periods labeled $DP_k$ with k=1 and 2. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_1$, and the data period $DP_2$, the electronics operate the light source such that the frequency of the system output signal changes at a linear rate a. The direction of the frequency change during the data period $DP_1$ is the opposite of the direction of the frequency change during the data period $DP_2$.

The frequency output from the peak finder associated with the Complex Fourier transform represents the beat frequency of the composite signals that each includes a comparative signal beating against a reference signal. The frequency provided by the peak finder of the mathematical transformer 268 during a data period where electronics increase the frequency of the outgoing LIDAR signal during the data period such as occurs in data period $DP_1$ of FIG. 5C can be represented by $f_{ub}$. The frequency provided by the peak finder of the mathematical transformer 268 during a data period where electronics decrease the frequency of the outgoing LIDAR signal such as occurs in data period $DP_2$ of FIG. 5C can be represented by $f_{db}$.

Figure 6A:
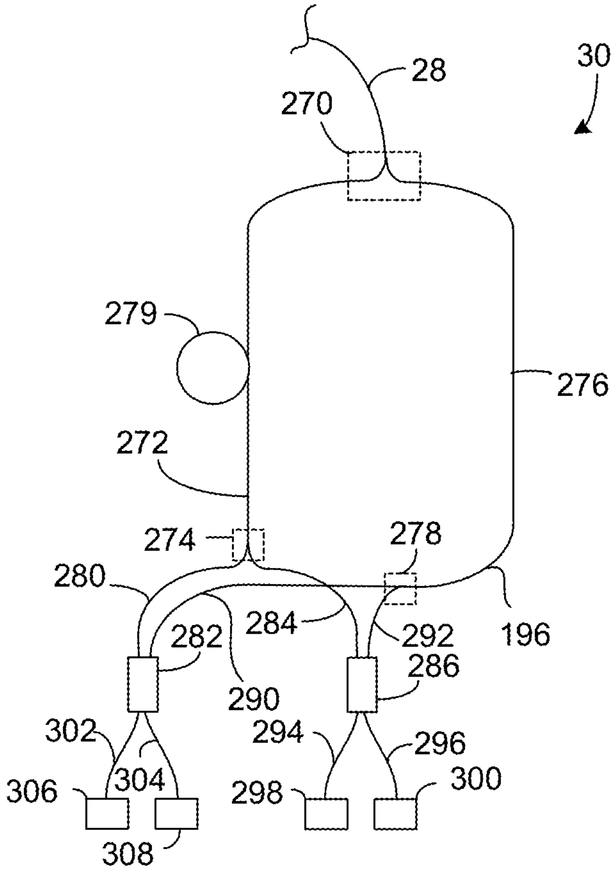
FIG. 6A and FIG. 6B illustrate an example of a suitable local component for use as all or a fraction of the local components disclosed in the context of FIG. 1A through FIG. 1C.
Figure 6B:
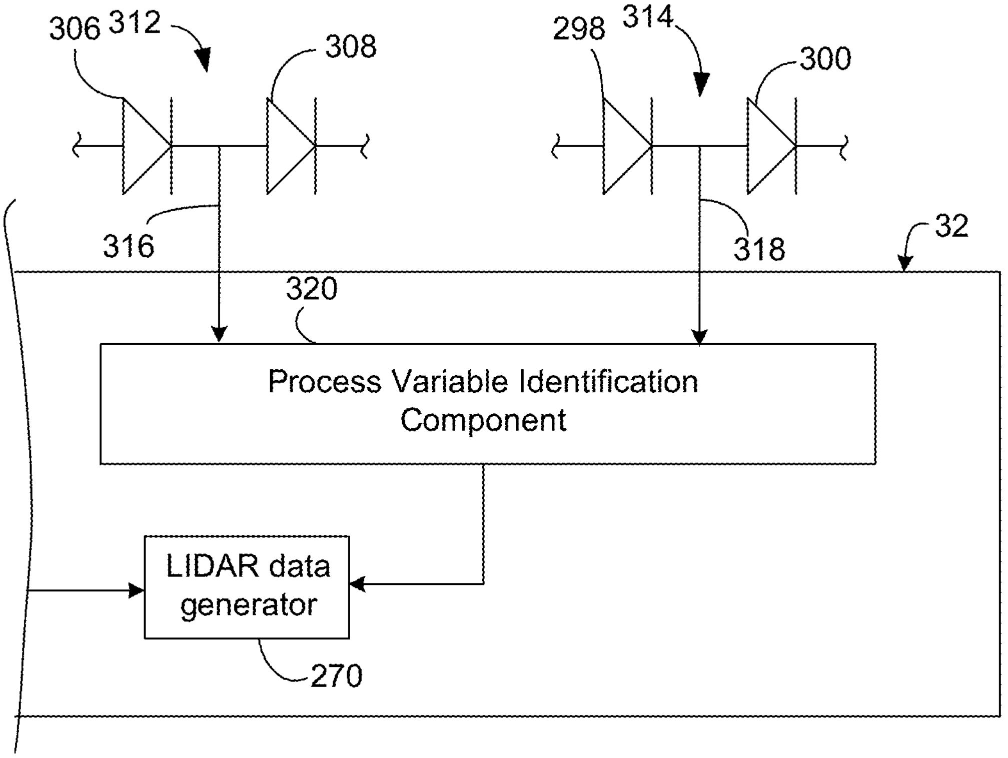

FIG. 6A and FIG. 6B illustrate an example of a suitable local components for use as all or a fraction of the local optical components 30 disclosed in the context of FIG. 1A through FIG. 1C and FIG. 4. The local optical components 30 includes a Mach-Zehnder interferometer configured to use light from the tapped signal to create an optical signal with an in-phase component and a quadrature component. The Mach-Zehnder interferometer receives the tapped signal from the control waveguide 28. The control waveguide guides the tapped signal to a splitter 270 that divides the tapped signal into a delayed signal and an expedited signal. A delay waveguide 272 carries the delayed signal to a first splitter 274. An expedited waveguide 276 carries the expedited signal to a second splitter 278. The delay waveguide 272 can include a delay section 279 that can be used to increase the length of the delay waveguide beyond the length of the expedited waveguide 276. For instance, the delay section 279 shown in FIG. 6A can represent a spiral arrangement of the delay waveguide 272. Suitable splitters for uses as the splitter 270, first splitter 274, and second splitter 278 include, but are not limited to, directional couplers, optical couplers, y-junctions, tapered couplers, and Multi-Mode Interference (MMI) devices.

The first splitter 274 divides the delayed signal into a first portion of the delayed signal and a second portion of the delayed signal. A first delayed waveguide 280 carries the first portion of the delayed signal to a first light signal combiner 282. A second delayed waveguide 284 carries the second portion of the delayed signal to a second light signal combiner 286. The second splitter 278 divides the expedited signal into a first portion of the expedited signal and a second portion of the expedited signal. A first expedited waveguide 290 carries the first portion of the expedited signal to the first light signal combiner 282. A second expedited waveguide 292 carries the second portion of the expedited signal to the second light signal combiner 286. As will become evident below, the first light signal combiner 282 and the second light signal combiner 286 can each serve as a local light signal that combine a first local signal with a second local signal so as to generate a local beating signal beating at a local beat frequency.

As is evident from FIG. 6A, the light in the first portion of the expedited signal and the light in the first portion of the delayed signal were both carried in a common signal but travel different paths from the common signal to the first light signal combiner 282. For instance, the light in the first portion of the expedited signal and the light in the first portion of the delayed signal were both carried in the tapped signal and in the outgoing LIDAR signal. As a result, the tapped signal and/or the outgoing LIDAR signal can serve as the common signal for the light in the first portion of the expedited signal and the light in the first portion of the delayed signal. The light in the first portion of the expedited signal can travel a first pathway from the common signal to the first light signal combiner 282 and the light in the first portion of the delayed signal can travel a second pathway from the common signal to the first light signal combiner 282. For instance, the first pathway can include the delay waveguide 272 and the first delayed waveguide 280 and the second pathway can include the expedited waveguide 276 and the first expedited waveguide 290. The first pathway and the second pathway can optionally include the control waveguide 28. The first pathway and the second pathway are configured such that there is a length differential between the length of the first pathway and the second pathway ($l_{wg}$). The length differential ($l_{wg}$) results in a delay between the time for the light in the first portion of the expedited signal to travel from the common signal to the first light signal combiner 282 and the time for the light in the first portion of the delayed signal (t) to travel from the common signal to the first light signal combiner 282.

The light in the second portion of the expedited signal and the light in the second portion of the delayed signal were both carried in a common signal but travel different paths from the common signal to the second light signal combiner 286. For instance, the light in the second portion of the expedited signal and the light in the second portion of the delayed signal were both carried in the tapped signal and in the outgoing LIDAR signal. As a result, the tapped signal and/or the outgoing LIDAR signal can serve as the common signal for the light in the second portion of the expedited signal and the light in the second portion of the delayed signal. The light in the second portion of the expedited signal can travel a first pathway from the common signal to the second light signal combiner 286 and the light in the second portion of the delayed signal can travel a second pathway from the common signal to the second light signal combiner 286. For instance, the first pathway to the second light signal combiner 286 can include the delay waveguide 272 and the second delayed waveguide 284 and the second pathway to the second light signal combiner 286 can include the expedited waveguide 276 and the second expedited waveguide 292. The first pathway to the second light signal combiner 286 and the second pathway can to the second light signal combiner 286 optionally include the control waveguide 28. The first pathway to the second light signal combiner 286 and the second pathway to the second light signal combiner 286 are configured such that there is a second length differential between the length of the first pathway and the second pathway ($sl_{wg}$). The second length differential ($sl_{wg}$) can be the same or substantially the same as the length differential ($l_{wg}$). The second length differential ($sl_{wg}$) results in a second delay between the time for the light in the first portion of the expedited signal to travel from the common signal to the second light signal combiner 286 and the time for the light in the second portion of the delayed signal ($s\tau$) to travel from the common signal to the second light signal combiner 286. The second delay ($s\tau$) can be the same or substantially the same as the delay ($s\tau$).

The second light signal combiner 286 combines the second portion of the expedited signal and the second portion of the delayed signal into a second local signal. As noted above, the length of the delay waveguide exceeds the length of the expedited waveguide 276. As a result, the second portion of the delayed signal is delayed relative to the second portion of the expedited signal. Because the electronics can tune the frequency of the outgoing LIDAR signal, the delay causes the second portion of the delayed signal to have a different frequency than the second portion of the expedited signal. Due to the difference in frequencies between the second portion of the expedited signal and the second portion of the delayed signal, the second local signal is beating between the second portion of the expedited signal and the second portion of the delayed signal.

The second light signal combiner 286 also splits the second local signal onto a first auxiliary detector waveguide 294 and a second auxiliary detector waveguide 296. The first auxiliary detector waveguide 294 carries a first portion of the second local signal to a first auxiliary light sensor 298 that converts the first portion of the second local signal to a first auxiliary electrical signal. The second auxiliary detector waveguide 296 carries a second portion of the second local signal to a second auxiliary light sensor 300 that converts the second portion of the second local signal to a second auxiliary electrical signal. Examples of suitable light sensors include germanium photodiodes (PDs), and avalanche photodiodes (APDs).

In some instances, the second light signal combiner 286 splits the second local signal such that the portion of the expedited signal (i.e. the portion of the second portion of the expedited signal) included in the first portion of the second local signal is phase shifted by 180° relative to the portion of the expedited signal (i.e. the portion of the second portion of the expedited signal) in the second portion of the second local signal but the portion of the delayed signal (i.e. the portion of the second portion of the delayed signal) in the second portion of the second local signal is not phase shifted relative to the portion of the delayed signal (i.e. the portion of the second portion of the delayed signal) in the first portion of the second local signal.

The first light signal combiner 282 combines the first portion of the expedited signal and the first portion of the delayed signal into a first local signal. The delay section 279 delays the first portion of the delayed signal relative to the first portion of the expedited signal. As a result, the first portion of the delayed signal is delayed relative to the first portion of the expedited signal. The delay causes the first portion of the delayed signal to have a different frequency than the first portion of the expedited signal. Due to the difference in frequencies between the first portion of the expedited signal and the first portion of the delayed signal, the first local signal is beating between the second portion of the expedited signal and the second portion of the delayed signal.

The first light signal combiner 282 also splits the first local signal onto a first detector waveguide 302 and a second detector waveguide 304. The first detector waveguide 302 carries a first portion of the first local signal to a first light sensor 306 that converts the first portion of the second local signal to a first electrical signal. The second detector waveguide 304 carries a second portion of the second local signal to a second light sensor 308 that converts the second portion of the second local signal to a second electrical signal. Examples of suitable light sensors include germanium photodiodes (PDs), and avalanche photodiodes (APDs).

In some instances, the first light signal combiner 282 splits the first local signal such that the portion of the expedited signal (i.e. the portion of the first portion of the expedited signal) included in the first portion of the beating signal is phase shifted by 180° relative to the portion of the expedited signal (i.e. the portion of the first portion of the expedited signal) in the second portion of the beating signal but the portion of the delayed signal (i.e. the portion of the first portion of the delayed signal) in the first portion of the beating signal is not phase shifted relative to the portion of the delayed signal (i.e. the portion of the first portion of the delayed signal) in the second portion of the beating signal.

When the second light signal combiner 286 splits the second local signal such that the portion of the expedited signal in the first portion of the second local signal is phase shifted by 180° relative to the portion of the expedited signal in the second portion of the second local signal, the first light signal combiner 282 also splits the beating signal such that the portion of the expedited signal in the first portion of the beating signal is phase shifted by 180° relative to the portion of the expedited signal in the second portion of the beating signal.

Suitable first light signal combiners 282 and second light signal combiner 286 include, but are not limited to, Multi-Mode Interference couplers, directional couplers, and tapered couplers.

The first delayed waveguide 280, the second delayed waveguide 284, the first expedited waveguide 290, and the second expedited waveguide 292 can be configured such that the first local signal and the second local signal together act as an in-phase component and quadrature component of a local beating signal where the first local signal is the in-phase component of the local beating signal and the second local signal is the quadrature component of the local beating signal or such that the second local signal is the in-phase component of the local beating signal and the first local signal is the quadrature component of the local beating signal. For instance, the first delayed waveguide 280 and the second delayed waveguide 284 can be constructed to provide a phase shift between the first portion of the delayed signal and the second portion of the delayed signal while the first expedited waveguide 290 and the second expedited waveguide 292 are constructed such that the first portion of the expedited signal and the second portion of the expedited signal are in phase. As an example, the first delayed waveguide 280 and the second delayed waveguide 284 can be constructed so as to provide a 90° phase shift between the first portion of the delayed signal and the second portion of the delayed signal. Accordingly, one of the delayed signal portions can be a sinusoidal function and the other delayed signal portion can be a cosine function operating on the same argument as the sinusoidal function. In one example, the first delayed waveguide 280 and the second delayed waveguide 284 are constructed such that the first portion of the delayed signal is a cosine function and the second portion of the delayed signal is a sine function. In this example, the portion of the delayed signal in the second local signal is phase shifted relative to the portion of the delayed signal in the first local signal, however, the portion of the expedited signal in the first local signal is not phase shifted relative to the portion of the expedited signal in the second local signal. The 90° phase shift can be introduced by the first delayed waveguide 280 or the second delayed waveguide 284. Alternately, the first delayed waveguide 280 can introduce a 45 degree phase shift and the second delayed waveguide 284 can introduce a 45 degree phase shift to achieve the 90° phase shift.

In another example, the first delayed waveguide 280 and the second delayed waveguide 284 are constructed such that the first portion of the delayed signal and the second portion of the delayed signal are in phase while the first expedited waveguide 290 and the second expedited waveguide 292 are constructed to provide a phase shift between the first portion of the expedited signal and the second portion of the expedited signal. As an example, the first expedited waveguide 290 and the second expedited waveguide 292 can be constructed so as to provide a 90° phase shift between the first portion of the expedited signal and the second portion of the expedited signal. Accordingly, one of the expedited signal portions can be a sinusoidal function and the other expedited signal portion can be a cosine function operating on the same argument as the sinusoidal function. In one example, the first expedited waveguide 290 and the second expedited waveguide 292 are constructed such that the first portion of the expedited signal is a cosine function and the second portion of the expedited signal is a sine function operating on the same argument as the cosine function. In this example, the portion of the expedited signal in the second local signal is phase shifted relative to the portion of the expedited signal in the first local signal, however, the portion of the delayed signal in the first local signal is not phase shifted relative to the portion of the delayed signal in the second local signal. The 90° phase shift can be provided by the first expedited waveguide 290 or the second expedited waveguide 292. Alternately, the first expedited waveguide 290 can introduce a 45 degree phase shift and the second expedited waveguide 292 can introduce a 45 degree phase shift to achieve the 90° phase shift.

The first light sensor 306 and the second light sensor 308 can be connected as a balanced detector and the first auxiliary light sensor 298 and the second auxiliary light sensor 300 can also be connected as a balanced detector. For instance, FIG. 6B provides a schematic of the relationship between the electronics, the first light sensor 306, the second light sensor 308, the first auxiliary light sensor 298, and the second auxiliary light sensor 300. The symbol for a photodiode is used to represent the first light sensor 306, the second light sensor 308, the first auxiliary light sensor 298, and the second auxiliary light sensor 300 but one or more of these sensors can have other constructions. In some instances, all of the components illustrated in the schematic of FIG. 6B are included on the LIDAR chip. In some instances, the components illustrated in the schematic of FIG. 6B are distributed between the LIDAR chip and electronics located off of the LIDAR chip.

The electronics connect the first light sensor 306 and the second light sensor 308 as a first balanced detector 312 and the first auxiliary light sensor 298 and the second auxiliary light sensor 300 as a second balanced detector 314. In particular, the first light sensor 306 and the second light sensor 308 are connected in series. Additionally, the first auxiliary light sensor 298 and the second auxiliary light sensor 300 are connected in series. The serial connection in the first balanced detector is in communication with a first data line 316 that carries the output from the first balanced detector as a first local electrical signal. The serial connection in the second balanced detector is in communication with a second data line 318 that carries the output from the second balanced detector as a second local electrical signal.

The first local electrical signal is an electrical representation of the first local signal and the second local electrical signal is an electrical representation of the second local signal. Accordingly, the first local electrical signal is beating and the second local electrical signal is beating. Additionally, the first local electrical signal and the second local electrical signal can each carry a different one of the components selected from a group consisting of the in-phase component of a local beating electrical signal and the quadrature component of the local beating electrical signal. For instance, the first local electrical signal can include a contribution from a first waveform and a second waveform and the second local electrical signal can include a contribution from the first waveform and the second waveform. The portion of the first waveform in the first local electrical signal is phase-shifted relative to the portion of the first waveform in the second local electrical signal but the portion of the second waveform in the first local electrical signal is in-phase relative to the portion of the second waveform in the second local electrical signal. For instance, the second local electrical signal can include a portion of the delayed signal that is phase shifted relative to a different portion of the delayed signal that is included the first local electrical signal. Additionally, the second local electrical signal can include a portion of the expedited signal that is in-phase with a different portion of the expedited signal that is included in the first local electrical signal. The first local electrical signal is beating at a local beat frequency as a result of the beating between the expedited signal and the delayed signal, i.e., the beating in the first local signal and in the second local signal. Similarly, the second local electrical signal is beating at the local beat frequency or is substantially beating at the local beat frequency.

The local beating electrical signal is received by a local beat frequency identifier 320. The local beat frequency identifier 320 uses the local beating electrical signal to determine the local beat frequency for the first local electrical signal and the second local electrical signal ($f_{TS}$) and accordingly the local beat frequency of the first local signal and the second local signal. The local beat frequency identifier 320 outputs an indicator that quantifies the local beat frequency ($f_{TS}$), is related to the local beat frequency ($f_{TS}$), or can be used to quantify the local local beat frequency ($f_{TS}$). The LIDAR data generator 270 receives the indicator signal from the local beat frequency identifier 320. The local beat frequency identifier 320 can execute the attributed functions using firmware, hardware or software or a combination thereof.

Figure 6C:
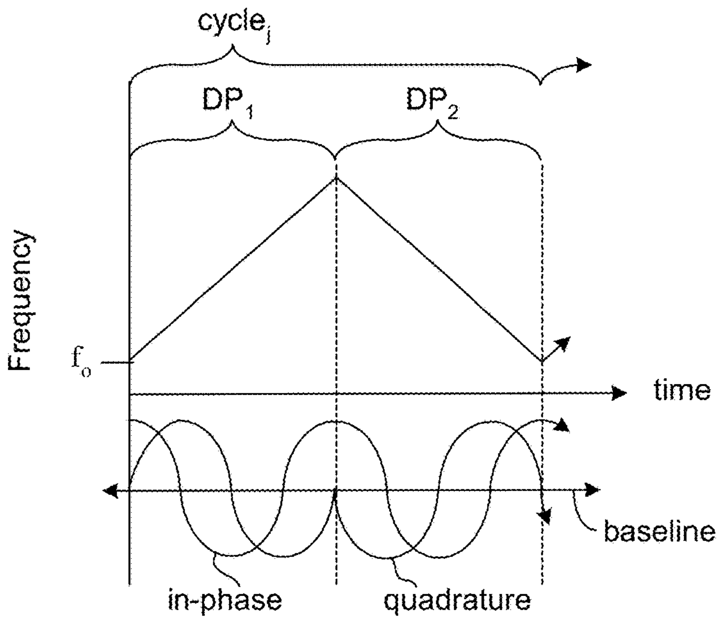
FIG. 6C is a graph showing an amplitude for an in-phase and quadrature components of a signal on the same time axis with the frequency of the system output signal.

FIG. 6C illustrates the amplitude for the in-phase and quadrature components of the local beating electrical and/or the local beating signal on the same time axis with the frequency of the system output signal. For instance, FIG. 6C can compare the frequency of the system output signal during the first two data periods shown in FIG. 5C compared against the variation of the in-phase and quadrature components of the local beating electrical and/or the local beating signal. Although FIG. 6C illustrates the local beating electrical and/or the local beating signal having only one period per data period, the local beating electrical and/or the local beating signal can have more than one period per data period. Additionally, the number of beating cycles within one modulation period may not be an integer number. For example, one might get 40.3 cycles of beating within one data period.

Figure 6D:
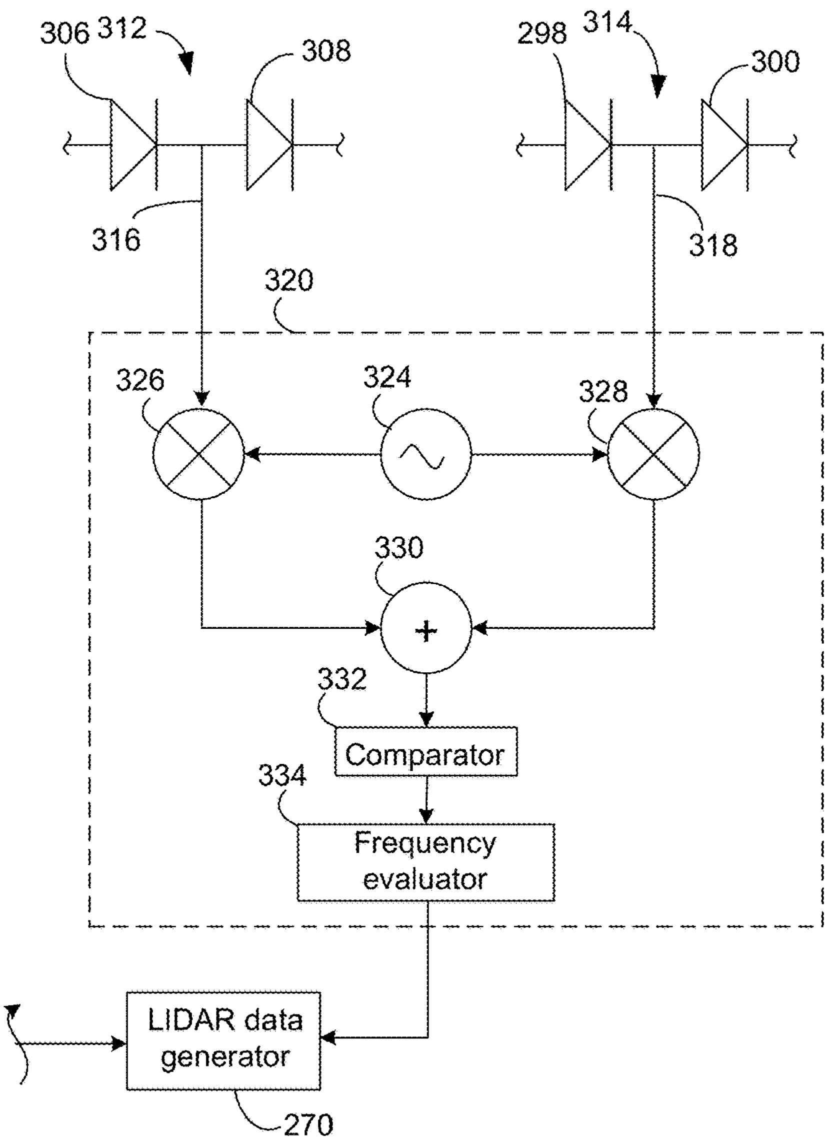
FIG. 6D illustrates one example of a local beat frequency identifier suitable for use in the electronics of a LIDAR system.

A variety of local beat frequency identifiers 320 can be used to determine a value for the local beat frequency ($f_{TS}$). FIG. 6D illustrates one example of a local beat frequency identifier 320. The illustrated local beat frequency identifier 320 includes a local oscillator 324 that outputs a local oscillator signal that includes first local oscillator signal and a second local oscillator signal. The first local signal and the second local oscillator signal each carries a different one of the components selected from the group consisting of an in-phase component of the local oscillator signal and a quadrature component of the local oscillator signal.

The local beat frequency identifier 320 also includes a first multiplier 326 that receives the first local electrical signal and the first local oscillator signal. The first multiplier 326 multiplies the first local electrical signal and the first local oscillator signal. When the first local electrical signal carries the in-phase component of the local electrical signal, the first local oscillator signal carries the quadrature component of the local oscillator signal. When the first local electrical signal carries the quadrature component of the local electrical signal, the first local oscillator signal carries the in-phase component of the local oscillator signal. The first multiplier 326 outputs a first multiplied signal.

The local beat frequency identifier 320 also includes a second multiplier 328 that receives the second local electrical signal and the second local oscillator signal. The second multiplier 328 multiplies the second local electrical signal and the second local oscillator signal. When the second local electrical signal carries the in-phase component of the local electrical signal, the second local oscillator signal carries the quadrature component of the local oscillator signal. When the second local electrical signal carries the quadrature component of the local electrical signal, the second local oscillator signal carries the in-phase component of the local oscillator signal. The second multiplier 326 outputs a second multiplied signal.

The local beat frequency identifier 320 includes an adder 330 that receives the first multiplied signal and the second multiplied signal. The adder 330 adds the first multiplied signal and the second multiplied signal and outputs a control signal.

The control signal is received at a beat frequency evaluator 334. The beat frequency evaluator 334 uses the control signal to output an indicator signal with one or more characteristics that are related to the local beat frequency ($f_{TS}$). For instance, the beat frequency evaluator 334 can be a Time-to-Digital Converter (TDC) that outputs an indicator signal with a voltage that is related to the local beat frequency ($f_{TS}$). In some instances, the Time-to-Digital Converter (TDC) outputs an indicator signal with a voltage that is proportional to the local beat frequency ($f_{TS}$). The indicator signal can be received by the LIDAR data generator 270.

Another example of a suitable beat frequency evaluator 334 is a frequency counter that outputs an indicator signal that indicates a time between baseline crossings (dn) of the control signal. The local beat frequency ($f_{TS}$) can be related to the time between baseline crossings (dn) by Equation 1: $f_{TS}=1/(2*dn)-f_{LO}$ where $f_{LO}$ represents the frequency of the local oscillator. In some instances, $f_{LO}>f_{TS}$. The beat frequency evaluator 334 can output an indicator signal that carries the value calculated for the local beat frequency ($f_{TS}$). The indicator signal can be received by the LIDAR data generator 270.

The local oscillator signal is selected such that the frequency of the control signal is higher than the frequency of the local electrical signal. The increased frequency of the control signal increases the frequency that the local electrical can be accurately sampled. Suitable sampling frequencies include, but are not limited to, sampling frequencies greater than 100 times the modulation frequency, where the modulation frequency is 1/(duration of a cycle). In some instances, all or a portion of the data periods in each cycle have a sampling frequency greater than 30 or 100 times per duration of the data period. In some instances, the local oscillator signal is selected such that the frequency of the control signal is more than 100, and less than 10,000 times higher than the frequency of the local electrical signal.

Figure 6E:
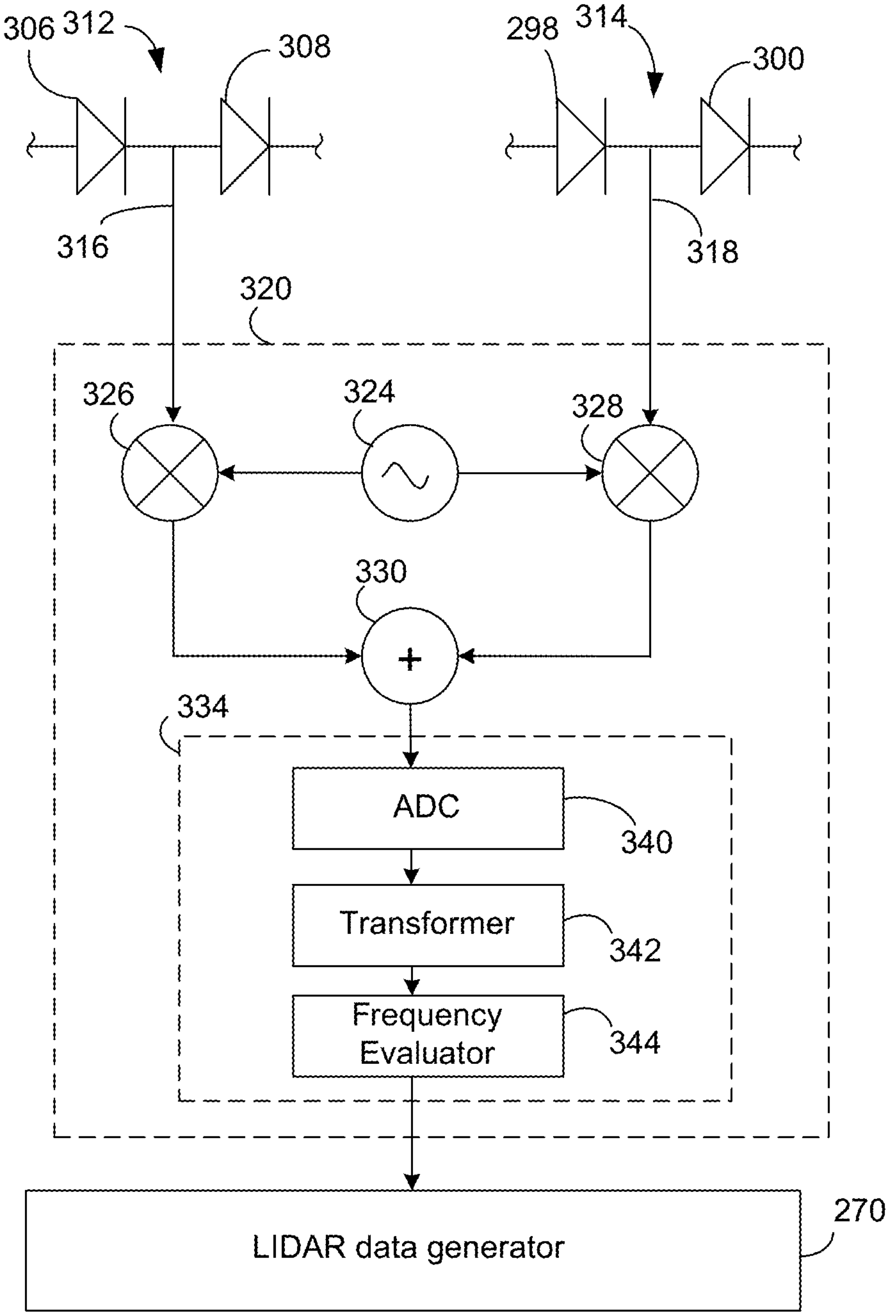
FIG. 6E illustrates another example of a local beat frequency identifier suitable for use in the electronics of a LIDAR system.

FIG. 6E illustrates another example of a suitable local beat frequency identifier 320. The local beat frequency identifier 320 includes an Analog-to-Digital Converter (ADC) 340 that receives the control signal from the adder 330. The Analog-to-Digital Converter (ADC) 340 converts the first local electrical signal from an analog form to a digital form and outputs a digital data signal. The digital data signal is a digital representation of the control signal.

The local beat frequency identifier 320 includes a transformer 342 that receives the digital data signal. The transformer 342 performs a mathematical transform on the digital data signal. The mathematical transform is selected such that the transformer 342 outputs a transformed signal that is related to, includes or indicates the frequency of the LIDAR output signal. A suitable first mathematical transform includes, but is not limited to, a Hilbert transform. A Hilbert transform outputs a transformed signal that indicates the instantaneous phase and, consequently, the local beat frequency ($f_{TS}$). The transformer 342 can execute the attributed functions using firmware, hardware or software or a combination thereof.

The transformed signal is received by a frequency evaluator 344. The frequency evaluator can be configured to output an indicator signal that is related to, includes and/or indicates the value of the local beat frequency ($f_{TS}$). For instance, the frequency evaluator can convert the instantaneous frequency to the local beat frequency ($f_{TS}$) by $f_{TS}=(finst-f_{LO})*(T/\tau)$, where $f_{LO}$ is the frequency of the local oscillator, finst is the instantaneous frequency extracted from the Hilbert Transform, T is the duration of a data period in a triangular modulation scheme, and $\tau$ is the delay resulting from the length differential between the delay waveguide 272 and the expedited waveguide 276. Accordingly, the indicator signal can be a digital signal that quantifies the local beat frequency ($f_{TS}$). The frequency evaluator 344 can execute the attributed functions using firmware, hardware or software or a combination thereof. The indicator signal can be received by the LIDAR data generator 270.

Figure 6F:
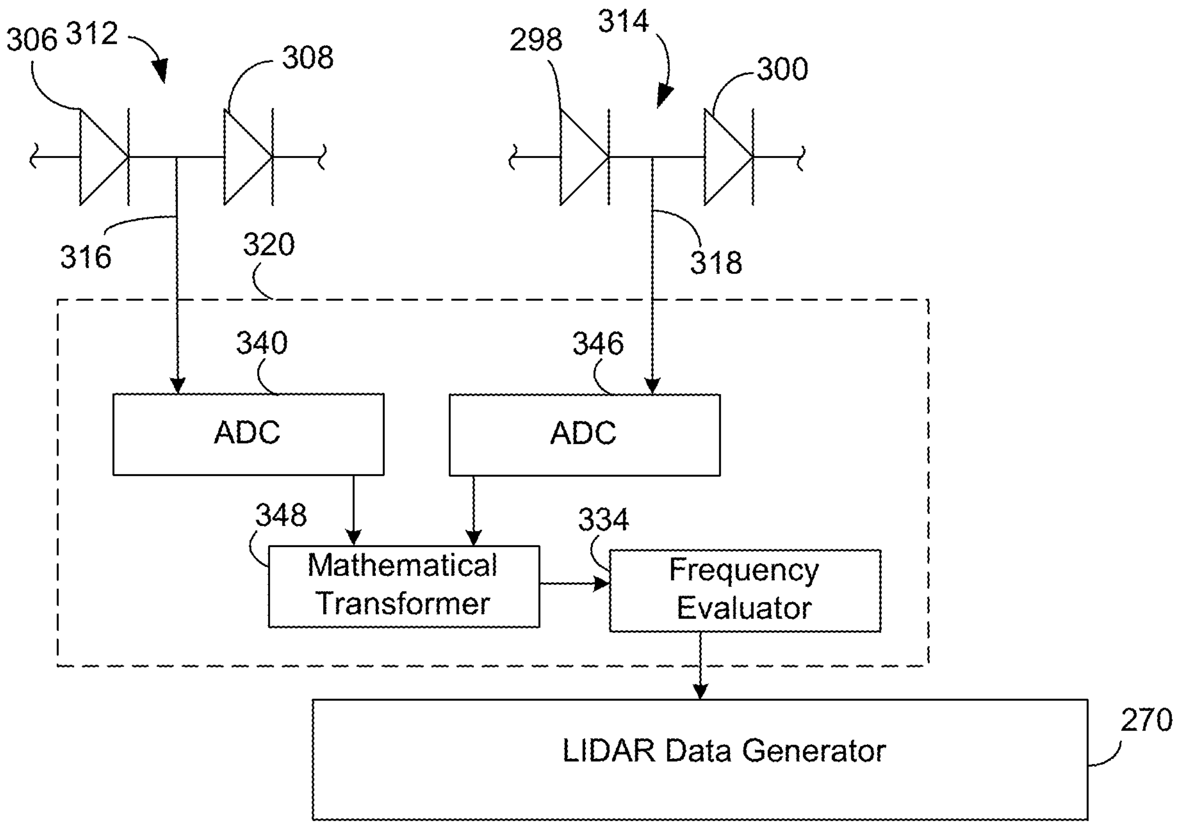
FIG. 6F illustrates another example of a local beat frequency identifier suitable for use in the electronics of a LIDAR system.

FIG. 6F illustrates another example of a suitable local beat frequency identifier 320. The local beat frequency identifier 320 includes a first Analog-to-Digital Converter (ADC) 340 that receives the first local electrical signal from the first data line 316. The first Analog-to-Digital Converter (ADC) 340 converts the first local electrical signal from an analog form to a digital form and outputs a first digital data signal. The local beat frequency identifier 320 includes a second Analog-to-Digital Converter (ADC) 346 that receives the second local electrical signal from the second data line 318. The second Analog-to-Digital Converter (ADC) 346 converts the second local signal from an analog form to a digital form and outputs a second digital data signal. The first digital data signal is a digital representation of the first local electrical signal and the second digital data signal is a digital representation of the second local electrical signal. Accordingly, the first digital data signal and the second digital data signal act together as a complex signal where the first digital data signal acts as the in-phase component of the complex signal and the second digital data signal acts as the quadrature component of the complex.

The local beat frequency identifier 320 includes a mathematical transformer 348 that receives the local electrical signal. The mathematical transformer 348 performs a mathematical transform on the local electrical signal. The mathematical transform is selected such that the mathematical transformer 348 outputs a transformed signal that includes or indicates the frequency of the LIDAR output signal. Suitable mathematical transforms for the transform component 344 include, but are not limited to, a complex transform such as a complex Fast Fourier Transform (FFT), Cross-correlation, wavelet transform, arctangent and/or other trigonometric conversions. In one example, the mathematical transform is a complex Fast Fourier Transform (FFT). The mathematical transformer 348 outputs a transformed signal that has a peak at the local beat frequency ($f_{TS}$). The mathematical transformer 348 can execute the attributed functions using firmware, hardware or software or a combination thereof. The indicator signal can be received by the LIDAR data generator 270.

The transformed signal is received at the frequency evaluator 334. The frequency evaluator 334 can include a peak finder. The peak finder can be configured to identify any frequency peaks in the transformed signal that are associated with the local beat frequency ($f_{TS}$). For instance, frequency peaks associated with the local beat frequency ($f_{TS}$) can fall within a frequency range. The peak finder can identify the frequency peak within the range of frequencies associated with the local beat frequency ($f_{TS}$). The frequency of the identified frequency peak represents the local beat frequency ($f_{TS}$). The frequency evaluator 334 can output an indicator signal that indicates the value determined for the local beat frequency ($f_{TS}$). The frequency evaluator 334 can execute the attributed functions using firmware, hardware or software or a combination thereof. The indicator signal can be received by the LIDAR data generator 270. The indicator signal can be received by the LIDAR data generator 270.

As is evident from the above discussion, the LIDAR data generator 270 receives the indicator signal from the local beat frequency identifier 320. As a result, the LIDAR data generator can extract and/or calculate the value of the local beat frequency ($f_{TS}$) from the indicator signal. Additionally, the LIDAR data generator 270 receives the beat frequency of the composite signal from the mathematical transformer 268. As a result, the LIDAR data generator 270 can use the received beat frequencies to identify the values of $f_{ub}$ and $f_{db}$. The LIDAR data generator can calculate the distance between the LIDAR system and an object in a sample region (R) from the following Equation 2: $R=((l_{wg})(n_{wg})/4)((f_{ub}/f_n)+(f_{db}/f_n))$ where $l_{wg}$ represents the length differential between the length of the first pathway and the second pathway, and $f_n$ represents a normalizing local beat frequency. The term $n_{wg}$ represents the index of refraction of the first pathway and/or the second pathway. For instance, $n_{wg}$ can represent the index of refraction of the delay waveguide 272. As a result, the value of $(l_{wg})(n_{wg})/4$ is a constant that can be represented by C. Accordingly, Equation 2 can be written as $C\,(f_{ub}+f_{db})/f_n$. In Equation 2, the variable ($f_{ub}/f_n$) and the variable ($f_{db}/f_n$) each represents a normalized beat frequency where the beat frequency of the composite signal (the composite beat frequency) is normalized by the normalizing local beat frequency.

The LIDAR data generator can calculate the radial velocity between the LIDAR system and an object in a sample region (v) from the following Equation 3: $v=(\lambda/2)*(f_{ub}*f_{TSdb}-f_{db}*f_{TSub})/(f_{TSub}+f_{TSdb})$ where $f_{TSub}$ represents a value of the local beat frequency that results from a data period where electronics increase the frequency of the outgoing LIDAR signal during the data period such as occurs in data period $DP_1$ of FIG. 5C, and $f_{TSdb}$ represents a value of the local beat frequency that results from a data period where electronics decrease the frequency of the outgoing LIDAR signal such as occurs in data period $DP_2$ of FIG. 5C. The term $\lambda$ represents the wavelength of the system output signal.

In some instances, it can be approximated that $f_{TSub}=f_{TSdb}=f_{TS}$. In these instances, the value of $f_{TS}$ can serve as the normalizing local beat frequency ($f_n=f_{TSub}=f_{TSdb}=f_{TS}$). As an example, it can be approximated that $f_{TSub}=f_{TSdb}=f_{TS}$ when the chirp rate is the same in each of the data periods from which the LIDAR data is calculated as shown in FIG. 5C. In some instances, the normalizing local beat frequency can be a function of the value of one or more local beat frequencies. The function of one or more local beat frequencies can exclude any variables that are not a value of a local beat frequency. Accordingly, the function of one or more local beat frequencies can include the value of one or more local beat frequencies, numbers, constant and none, one, or more than one mathematical operators. An example of a function of one or more local beat frequencies has the normalizing local beat frequency as an average of the values of local beat frequencies taken at different times. For instance, an example of a function of one or more local beat frequencies can be represented by $f_n=(f_{TSub}+f_{TSdb})/2$. In this example, the normalizing local beat frequency is an average of a value of the local beat frequency that results from a data period where electronics increase the frequency of the outgoing LIDAR signal and a value of the local beat frequency that results from a data period where electronics decrease the frequency of the outgoing LIDAR signal such as occurs. Other functions that can be used for the function of one or more local beat frequencies include, but are not limited to, a median of multiple local beat frequencies. The function of one or more local beat frequencies can be selected such that the normalizing local beat frequency is representative of the values of the composite signal beat frequencies ($f_{ub}$, $f_{db}$). Accordingly, the function of one or more local beat frequencies can be selected to provide the normalized beat frequencies ($f_{ub}/f_n$ and $f_{db}/f_n$) with a value on the order of one.

In Equation 2 and Equation 3, any values of $f_{ub}$, $f_{db}$, $f_{TS}$, $f_{TSub}$ and $f_{TSdb}$ in the same equation are each associated with the same sample region. For instance, the values of $f_{ub}$, $f_{db}$ can be the beat frequencies that result from the system output signal output in two adjacent data periods illustrated in FIG. 5C. As an example, the values of $f_{ub}$, $f_{db}$ can be the beat frequencies that result from the system output signal output from the data periods labeled $DP_1$ and $DP_2$ in $cycle_j$ of FIG. 5C. Accordingly, the light from a system output signal illuminating one of the sample regions in the field of view leads to the beat frequencies $f_{ub}$ and $f_{db}$ that are used in the above Equation 2. Additionally, the value of $f_{TS}$ is generated from the outgoing LIDAR signal that was the source of the light for the system output signal that illuminated the sample region. Since the values of $f_{ub}$, $f_{db}$, and $f_{TS}$ or $f_{ub}$, $f_{db}$, $f_{TSub}$ and $f_{TSdb}$ are each associated with the same sample region, the range (R) calculated from Equation 2 or Equation 3 is also associated with the sample region. Similarly, the radial velocity (v) calculated from Equation 4 is also associated with the sample region. As noted above, the system output signal can be steered to multiple different sample regions in the field of view. The LIDAR data generator can calculate the LIDAR data (distance between the LIDAR system and an object in the sample region and/or radial velocity between the LIDAR system and an object in the sample region) for all or a portion of the sample regions.

The presence of the quadrature component in the local beating signal and the local beating electrical signal can reduce the amount of delay that needs to be created by the delay waveguide 272 by increasing the sensitivity of the indicator signal to the frequency of the tapped signal by combining the information from in-phase and quadrature components at any given time. Prior systems attempted to increase this sensitivity by increasing the length of the delay waveguide 272. Because the local beat frequency identifier 320 increases the sensitivity of the indicator signal, the length of the delay waveguide 272 can exceed the length of the expedited waveguide 276 by a lower amount than could be achieved in prior systems. For instance, the time delay in the delay waveguide 272 can exceed the time delay in the expedited waveguide 276 by an amount that is greater than or equal to 50 ps and less than or equal to 100 ns. In one example, the length of the delay waveguide 272 exceeds the length of the expedited waveguide 276 by an amount that is less than 1000 cm, less than 500 cm, or less than 100 cm and is greater than 0.0 cm or 0.4 cm. In one example, the delay waveguide 272 and the expedited waveguide 276 guide light through silicon and the length of the delay waveguide 272 exceed the length of the expedited waveguide 276 by an amount that is less than 1000 cm and greater than 0.0 cm or 0.4 cm.

The local beating signal and the local beating electrical signal need not include both the quadrature component and the in-phase component. For instance, the local beating signal and the local beating electrical signal can exclude the quadrature component or the in-phase component. As an example, the first local signal without the second local signal can serve as the local beating signal or the second local signal without the first local signal can serve as the local beating signal. The LIDAR system can exclude the superfluous electrical functionality and optical components. For instance, when the first local signal without the second local signal serve as the local beating signal, the LIDAR system can exclude the first splitter 274, second splitter 278, second expedited waveguide 292, second delayed waveguide 284, second light signal combiner 286, first auxiliary detector waveguide 294, second auxiliary detector waveguide 296, first auxiliary light sensor 298, second auxiliary light sensor 300, and second data line 318. Additionally, mathematical transforms the receive the local beating signal can be configured to operate on a real local beating signal. For instance, the mathematical transformer 348 can perform a real Fourier Transform such as a real Fast Fourier Transform (FFT).

As noted above, the electronics can employ the local branch and output from the local optical components 30 to control operation of the light source 4. For instance, the electronics can use all or a portion of the signals selected from the group consisting of the first portion of the first local signal, the second portion of the first local signal, the first portion of the second local signal, the second portion of the second local signal, the first local electrical signal and the second local electrical signal to provide the system output signal with the desired frequency versus time profile as illustrated in FIG. 5C. As an example, the first local electrical signal can serve as the electrical beating control signal in the control signal processor of U.S. patent application Ser. No. 18/072,666, filed on Nov. 30, 2022, entitled "Control of Signal Chirp in LIDAR Systems" and incorporated herein in its entirety. Alternately, the first local electrical signal and the second local electrical signal can respectively serve as the first process variable signal and the second process variable signal of U.S. patent application Ser. No. 16/875,987, filed on May 16, 2020, entitled "Monitoring Signal Chirp in LIDAR Output Signals" and incorporated herein in its entirety. Accordingly, the LIDAR system can include the optical components and/or the electronics 32 can include the functionality disclosed in U.S. patent application Ser. No. 18/072,666 and U.S. patent application Ser. No. 16/875,987 for controlling the process variable of one, two, or three controlled light signals selected from the group consisting of the tapped signal, the system output signal, and the outgoing LIDAR signal. One or more signal splitters can be added to the disclosed local branch as needed to add the functionality of the control signal processor to the functionality disclosed herein.

Figure 7:
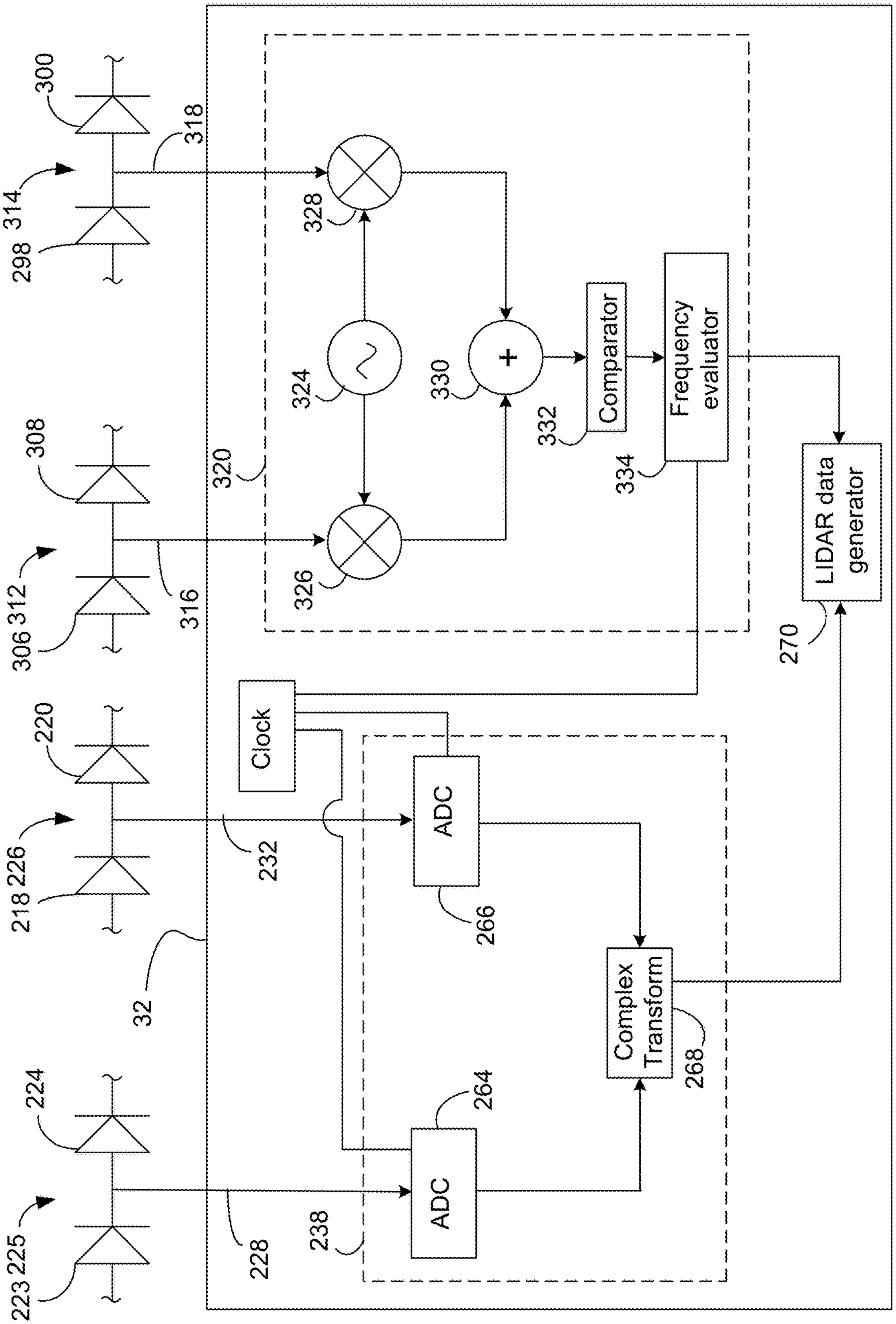
FIG. 7 illustrates a data transformer that shares a clock with a local beat frequency identifier.
Figure 8:
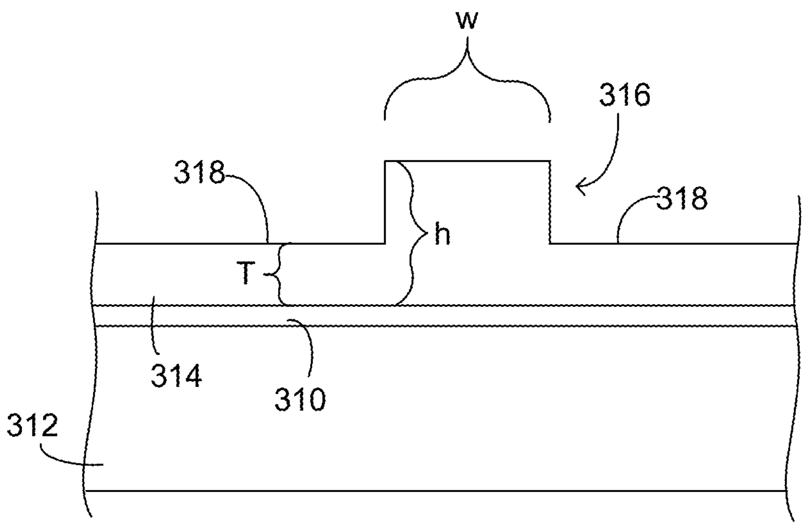
FIG. 8 is a cross-section of portion of a LIDAR chip that includes a waveguide on a silicon-on-insulator platform.

In some instances, the data transformer 238 and the local beat frequency identifier 320 share the same clock. For instance, FIG. 7 illustrates a data transformer 238 constructed as disclosed in the context of FIG. 5B and a local beat frequency identifier 320 constructed as disclosed in the context of FIG. 6D. The electronics 32 include a clock 360 in electrical communication with the frequency evaluator 334 in the local beat frequency identifier 320. The clock 360 can also be in electrical communication with one or more Analog-to-Digital Converters (ADC) included in the data transformer 238. For instance, FIG. 8 illustrates the clock 360 in electrical communication with the first Analog-to-Digital Converter (ADC) and the second Analog-to-Digital Converter (ADC) 266. The frequency evaluator 334 can use the output of the clock 360 to measure the time between baseline crossings (dn) of the control signal. An Analog-to-Digital Converters (ADC) can use the clock to set the sample timing of the Analog-to-Digital Converter (ADC). For instance, an Analog-to-Digital Converter (ADC) can use the clock 360 to set the timing and/or the rate at which the first data signal or the second data signal is sampled. Accordingly, the clock 360 can serve as a sampling clock or an ADC clock. Suitable clocks 360 include, but are not limited to, crystal oscillator combined with a clock generator IC with a PLL that increases the clock frequency to the desired sample rate, MEMS oscillator combined with a clock generator IC, or other types of electromechanical, optical, or electrical oscillators. Using the same clock in both the local beat frequency identifier 320 and the data transformer 238 allows drift or noise in the clock 360 be cancelled to the first order so as to provide a clean ratio between the values of $(f_{ub}+f_{db})$ and $f_{TS}$. In the expression $(f_{ub}+f_{db})/f_{TS}$.

Suitable platforms for the LIDAR chips include, but are not limited to, silica, indium phosphide, and silicon-on-insulator wafers. FIG. 8 is a cross-section of portion of a chip constructed from a silicon-on-insulator wafer. A silicon-on-insulator (SOI) wafer includes a buried layer 310 between a substrate 312 and a light-transmitting medium 314. In a silicon-on-insulator wafer, the buried layer 310 is silica while the substrate 312 and the light-transmitting medium 314 are silicon. The substrate 312 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 312.

FIG. 8 is a cross section of a portion of a LIDAR chip that includes a waveguide construction that is suitable for use in LIDAR chips constructed from silicon-on-insulator wafers. A ridge 316 of the light-transmitting medium extends away from slab regions 318 of the light-transmitting medium. The light signals are constrained between the top of the ridge 316 and the buried oxide layer 310.

The dimensions of the ridge waveguide are labeled in FIG. 8. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 8 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 8472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

Suitable electronics 32 can include, but are not limited to, an electronic controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the electronic controller has access to a memory that includes instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demulitplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demulitplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:

A LIDAR system configured to transmit a system output signal from the LIDAR system such that a sample region is illuminated by the system output signal;

the LIDAR system including a first light signal combiner configured to combine light that returns to the LIDAR system from the system output signal with light from a reference signal so as to generate a composite signal beating at a composite beat frequency, the LIDAR system including a local light signal combiner configured to combine a first local signal with a second local signal so as to generate a local beating signal beating at a local beat frequency, the reference signal including light from an outgoing LIDAR signal, the system output signal including light from the outgoing LIDAR signal, the first local signal including light from the outgoing LIDAR signal, and the second local signal including light from the outgoing LIDAR signal;

electronics configured to perform a calculation that calculates a distance between the LIDAR system and an object in the sample region, a variable in the calculation being a normalized beat frequency, the normalized beat frequency being the composite beat frequency normalized by the local beat frequency.

2. The system of claim 1, wherein light included in the first local signal has not exited from the LIDAR system and light included in the second local signal has not exited from the LIDAR system.

3. The system of claim 1, wherein the normalized beat frequency can be represented by $f_{ub}/f_{TS}$ where $f_{ub}$ represents a value of the composite beat frequency while a frequency of the system output signal is increasing and $f_{TS}$ represents the local beat frequency.

4. The system of claim 1, wherein the normalized beat frequency can be represented by $f_{db}/f_{TS}$ where $f_{db}$ represents a value of the composite beat frequency while a frequency of the system output signal is decreasing and $f_{TS}$ represents the local beat frequency.

5. The system of claim 1, wherein the calculation is represented by $R=C((f_{ub}/f_{TS})+(f_{db}/f_{TS}))$ where R represents the distance between the LIDAR system and the object in the sample region, C represents a constant, $f_{ub}$ represents a value of the composite beat frequency while a frequency of the system output signal is increasing, $f_{db}$ represents a value of the composite beat frequency while a frequency of the system output signal is decreasing, and $f_{TS}$ represents the local beat frequency.

6. The system of claim 1, wherein the calculation is represented by $R=C^*((f_{ub}/f_{TS})+(f_{db}/f_{TS}))$ where R represents the distance between the LIDAR system and the object in the sample region, C is a constant, $f_{ub}$ represents a value of the composite beat frequency while a frequency of the system output signal is increasing, $f_{db}$ represents a value of the composite beat frequency while a frequency of the system output signal is decreasing, and $f_{TS}$ represents the local beat frequency.

7. The system of claim 6, where the first local signal travels a first optical pathway from the outgoing LIDAR signal to the local light signal combiner and the second local signal travels a second optical pathway from the outgoing LIDAR signal to the local light signal combiner, a length of the first optical pathway being different from a length of the second optical pathway, $C=l_{wg}{}^*n_{wg}$ and $l_{wg}$ is a length differential between the length of the first optical pathway and the length of the second pathway, $n_{wg}$ is the index of refraction of the first pathway or the second pathway.

8. The system of claim 1, wherein the calculation is represented by $R=C^*((f_{ub}/(f_{TSub}+f_{TSdb}))+(f_{db}/(f_{TSub}+f_{TSdb})))$ where R represents the distance between the LIDAR system and the object in the sample region, C is a constant, $f_{ub}$ represents a value of the composite beat frequency while a frequency of the system output signal is increasing, $f_{db}$ represents a value of the composite beat frequency while a frequency of the system output signal is decreasing, $f_{TSub}$ represents a value of the local beat frequency that results from a frequency of the outgoing LIDAR signal increasing and $f_{TSdb}$ represents a value of the local beat frequency that results from the frequency of the outgoing LIDAR signal decreasing.

9. The system of claim 1, wherein the electronics are configured to perform a second calculation represented by $v=C^*((f_{ub}{}^*f_{TSdb}/(f_{TSub}+f_{TSdb}))-f_{db}{}^*f_{TSub}/(f_{TSub}+f_{TSdb}))$ where v represents the radial velocity between the LIDAR system and the object in the sample region, C is a constant, $f_{ub}$ represents a value of the composite beat frequency while a frequency of the system output signal is increasing, $f_{db}$ represents a value of the composite beat frequency while a frequency of the system output signal is decreasing, $f_{TSub}$ represents a value of the local beat frequency that results from a frequency of the outgoing LIDAR signal increasing and $f_{TSdb}$ represents a value of the local beat frequency that results from the frequency of the outgoing LIDAR signal decreasing.

10. The system of claim 9, wherein $C=N/2$ where $\lambda$ represents a wavelength of the system output signal.

11. The system of claim 1, wherein the LIDAR system includes a clock that sets a timing at which an Analog-to-Digital Converter (ADC) samples an electrical data signal beating at the composite beat frequency, and the electronics use the clock to measure a time between baseline crossings of an electrical control signal, the electronics calculating the local beat frequency from the measured time between baseline crossings of the electrical signal.

12. The system of claim 1, wherein light included in the reference signal, light included in the first local signal, and light included in the second local signal does not exit from the LIDAR system.

13. The system of claim 1, wherein a value of the local beat frequency serves as the normalizing local beat frequency.

14. The system of claim 1, wherein a value of the local beat frequency is determined at multiple different times and the normalizing local beat frequency includes an average of the values of the local beat frequency.

15. A method of operating a system comprising:

causing a LIDAR system to transmit a system output signal from the LIDAR system such that a sample region is illuminated by the system output signal;

combining light that returns to the LIDAR system from the system output signal with light from a reference signal so as to generate a composite signal beating at a composite beat frequency, combining a first local signal with a second local signal so as to generate a local beating signal beating at a local beat frequency, the reference signal including light from an outgoing LIDAR signal, the system output signal including light from the outgoing LIDAR signal, the first local signal including light from the outgoing LIDAR signal, and the second local signal including light from the outgoing LIDAR signal;

performing a calculation that calculates a distance between the LIDAR system and an object in the sample region, a variable in the calculation being a normalized beat frequency, the normalized beat frequency being the composite beat frequency normalized by the local beat frequency.

16. The method of claim 15, wherein light included in the first local signal has not exited from the LIDAR system and light included in the second local signal has not exited from the LIDAR system.

17. The method of claim 15, wherein the normalized beat frequency can be represented by $f_{ub}/f_{TS}$ where $f_{ub}$ represents a value of the composite beat frequency while a frequency of the system output signal is increasing and $f_{TS}$ represents the local beat frequency.

18. The method of claim 15, wherein the normalized beat frequency can be represented by $f_{db}/f_{TS}$ where $f_{db}$ represents a value of the composite beat frequency while a frequency of the system output signal is decreasing and $f_{TS}$ represents the local beat frequency.

19. The method of claim 15, wherein the calculation is represented by $R=C((f_{ub}/f_{TS})+(f_{db}/f_{TS}))$ where R represents the distance between the LIDAR system and the object in the sample region, C represents a constant, $f_{ub}$ represents a value of the composite beat frequency while a frequency of the system output signal is increasing, $f_{db}$ represents a value of the composite beat frequency while a frequency of the system output signal is decreasing, and $f_{TS}$ represents the local beat frequency.

20. The method of claim 12, wherein the first local signal travels a first optical pathway from the outgoing LIDAR signal to the local light signal combiner and the second local signal travels a second optical pathway from the outgoing LIDAR signal to the local light signal combiner, a length of the first optical pathway being different from a length of the second optical pathway.

21. The method of claim 12, wherein the calculation is represented by $R=(l_{wg})(n_{wg})((f_{ub}/f_{TS})+(f_{db}/f_{TS}))$ where R represents the distance between the LIDAR system and the object in the sample region, $l_{wg}$ is a length differential between the length of the first optical pathway and the length of the second pathway, $n_{wg}$ is the index of refraction of the first pathway or the second pathway, $f_{ub}$ represents a value of the composite beat frequency while a frequency of the system output signal is increasing, $f_{db}$ represents a value of the composite beat frequency while a frequency of the system output signal is decreasing, and $f_{TS}$ represents the local beat frequency.

22. The method of claim 12, wherein a clock that sets a timing at which an Analog-to-Digital Converter (ADC) samples an electrical data signal beating at the composite beat frequency, using the clock to measure a time between baseline crossings of an electrical control signal, and calculating the local beat frequency from the measured time between baseline crossings of the electrical signal.

* * * * *